US00RE49329E

(19) United States
(12) Reissued Patent
Hammarwall et al.

(10) Patent Number: US RE49,329 E
(45) Date of Reissued Patent: Dec. 6, 2022

(54) PRECODER STRUCTURE FOR MIMO PRECODING

(71) Applicant: Telefonaktiebolaget LM Ericsson (publ), Stockholm (SE)

(72) Inventors: David Hammarwall, Vallentuna (SE); George Jöngren, Sundbyberg (SE)

(73) Assignee: Telefonaktiebolaget LM Ericsson (publ), Stockholm (SE)

(21) Appl. No.: 17/218,623

(22) Filed: Mar. 31, 2021

Related U.S. Patent Documents

Reissue of:

(64) Patent No.: 10,250,308
Issued: Apr. 2, 2019
Appl. No.: 15/822,488
Filed: Nov. 27, 2017

U.S. Applications:

(63) Continuation of application No. 15/138,675, filed on Apr. 26, 2016, now Pat. No. 9,831,930, which is a (Continued)

(51) Int. Cl.
*H04B 7/02* (2018.01)
*H04B 7/0456* (2017.01)

(Continued)

(52) U.S. Cl.
CPC ..... *H04B 7/0456* (2013.01); *H04B 7/0478* (2013.01); *H04B 7/065* (2013.01);

(Continued)

(58) Field of Classification Search
None
See application file for complete search history.

(56) References Cited

U.S. PATENT DOCUMENTS 7,917,176 B2 * 3/2011 Khojastepour ..... H04B 7/0408 370/203
8,199,836 B2 6/2012 Khojastepour et al.

(Continued)

FOREIGN PATENT DOCUMENTS

CN 101529736 A 9/2009
CN 101578774 A 11/2009

(Continued)

OTHER PUBLICATIONS

3rd Generation Partnership Project. "Further Refinements of Feedback Framework." 3GPP TSG-RAN NG1 #60bis, R1-101742, Beijing, China, Apr. 12-16, 2010, pp. 1-8.

(Continued)

*Primary Examiner* — John M Hotaling
(74) *Attorney, Agent, or Firm* — Baker Botts, LLP

(57) ABSTRACT

The teachings herein present a method and apparatus that implement and use a factorized precoder structure that is advantageous in terms of performance and efficiency. In particular, the teachings presented herein disclose an underlying precoder structure that allows for certain codebook reuse across different transmission scenarios, including for transmission from a single Uniform Linear Array (ULA) of transmit antennas and transmission from cross-polarized subgroups of such antennas. According to this structure, an overall precoder is constructed from a conversion precoder and a tuning precoder. The conversion precoder includes antenna-subgroup precoders of size $N_T/2$, where $N_T$ represents the number of overall antenna ports considered. Correspondingly, the tuning precoder controls the offset of beam phases between the antenna-subgroup precoders, allowing (Continued)

the conversion precoder to be used with cross-polarized arrays of $N_T/2$ antenna elements and with co-polarized arrays of $N_T$ antenna elements.

15 Claims, 7 Drawing Sheets

Related U.S. Application Data continuation of application No. 14/057,011, filed on Oct. 18, 2013, now Pat. No. 9,331,830, which is a continuation of application No. 13/080,737, filed on Apr. 6, 2011, now Pat. No. 8,582,627.

(60) Provisional application No. 61/321,679, filed on Apr. 7, 2010.

(51) Int. Cl.

| | |
|---|---|
| ***H04B 7/06*** | (2006.01) |
| ***H04L 5/00*** | (2006.01) |
| ***H04W 72/04*** | (2009.01) |
| *H04B 7/10* | (2017.01) |

(52) U.S. Cl.

CPC ..... *H04B 7/0634* (2013.01); *H04B 7/0647* (2013.01); *H04L 5/0044* (2013.01); *H04W 72/0413* (2013.01); *H04B 7/0465* (2013.01); *H04B 7/0469* (2013.01); *H04B 7/0639* (2013.01); *H04B 7/10* (2013.01)

(56) References Cited

U.S. PATENT DOCUMENTS

| | | | | |
|---|---|---|---|---|
| 8,284,849 | B2 * | 10/2012 | Lee | H04L 1/02 375/267 |
| 8,472,547 | B2 | 6/2013 | Hammarwall et al. | |
| 8,605,809 | B2 | 12/2013 | Jongren et al. | |
| 8,724,543 | B2 | 5/2014 | Jongren et al. | |
| 8,760,994 | B2 | 6/2014 | Wang et al. | |
| 8,767,681 | B2 | 7/2014 | Hammarwall et al. | |
| 9,331,830 | B2 * | 5/2016 | Hammarwall | H04W 72/0413 |
| 2007/0160011 | A1 | 7/2007 | Kim et al. | |
| 2007/0191066 | A1 | 8/2007 | Khojastepour et al. | |
| 2007/0242770 | A1 | 10/2007 | Kim et al. | |
| 2008/0292013 | A1 | 11/2008 | Varadarajan et al. | |
| 2009/0006518 | A1 | 1/2009 | Rensburg et al. | |
| 2009/0052354 | A1 | 2/2009 | Wu et al. | |
| 2009/0059844 | A1 | 3/2009 | Ko et al. | |
| 2009/0066577 | A1 | 3/2009 | Kim et al. | |
| 2009/0067525 | A1 | 3/2009 | Kim et al. | |
| 2009/0274225 | A1 | 11/2009 | Khojastepour et al. | |
| 2010/0027713 | A1 | 2/2010 | Huang et al. | |
| 2010/0111211 | A1 | 5/2010 | Han et al. | |
| 2010/0304691 | A1 | 12/2010 | Goransson et al. | |
| 2011/0080901 | A1 | 4/2011 | Lin et al. | |
| 2011/0216846 | A1 | 9/2011 | Lee et al. | |
| 2012/0219091 | A1 * | 8/2012 | Li | H04L 25/03343 375/296 |
| 2012/0224649 | A1 | 9/2012 | Khojastepour et al. | |

FOREIGN PATENT DOCUMENTS

| | | | |
|---|---|---|---|
| CN | 101651642 | A | 2/2010 |
| CN | 101675602 | A | 3/2010 |
| EP | 1353452 | A2 | 10/2003 |
| EP | 2169845 | A1 | 3/2010 |
| RU | 2211536 | C2 | 8/2003 |
| RU | 2238611 | C1 | 10/2004 |
| RU | 2305898 | C2 | 9/2007 |
| RU | 2367096 | C2 | 9/2009 |
| WO | 9907090 | A1 | 2/1999 |
| WO | 2004075448 | A1 | 9/2004 |
| WO | 2005011147 | A1 | 2/2005 |
| WO | 2006041891 | A2 | 4/2006 |
| WO | 2007051192 | A2 | 5/2007 |
| WO | 2007092539 | A2 | 8/2007 |
| WO | 2008086239 | A1 | 7/2008 |
| WO | 2008133582 | A2 | 11/2008 |
| WO | 2008155707 | A1 | 12/2008 |
| WO | 2008156067 | A1 | 12/2008 |
| WO | 2009/025619 | A2 | 2/2009 |
| WO | 2009023686 | A2 | 2/2009 |
| WO | 2009023700 | A2 | 2/2009 |
| WO | 2009025619 | A2 | 2/2009 |
| WO | 2010002325 | A1 | 1/2010 |

OTHER PUBLICATIONS

3rd Generation Partnership Project. "Possible Refinement on 8Tx Codebook Design." 3GPP TSG RAN NG1 60bis, R1-102104, Beijing, China, Apr. 12-16, 2010, pp. 1-7.

3rd Generation Partnership Project. "Multiple Granularity Feedback Design for LTE-A." 3GPP TSG-RAN NG1 #60, R1-101399, San Fransicso, CA, USA, Feb. 22-26, 2010, pp. 1-9.

3rd Generation Partnership Project. "Further Refinements of Feedback Framework." 3GPP TSG-RAN WG1 #60bis, R1-101742, Beijing, China, Apr. 12-16, 2010, pp. 1-8.

3rd Generation Partnership Project. "Possible Refinement on 8Tx Codebook Design." 3GPP TSG RAN WG1 60bis, R1-102104, Beijing, China, Apr. 12-16, 2010, pp. 1-7.

3rd Generation Partnership Project. "CQI and MIMO Feedback for LTE." 3GPP TSG RAN WG1 #50-bis Meeting, R1-074356, Shanghai, China, Oct. 8-12, 2007, pp. 1-2.

3rd Generation Partnership Project. "Persistent CQI/PMI/Rank Reporting on PUCCH/PUSCH." 3GPP TSG RAN WG1 Meeting #52, R1-080765, Sorrento, Italy, Feb. 11-15, 2008, pp. 1-2.

3rd Generation Partnership Project. "Multiple Granularity Feedback Design for LTE-A." 3GPP TSG-RAN WG1 #60, R1-101399, San Fransicso, CA, USA, Feb. 22-26, 2010, pp. 1-9.

3rd Generation Partnership Project. "Precoding Codebook Design for 4 Node-B Antenna." 3GPP TSG RAN WG1 48bis, R1-071798, St. Julian's, Malta, Mar. 26-30, 2007, pp. 1-11.

3rd Generation Partnership Project. "Configuration of Feedback Mode for MIMO Transmission." 3GPP TSG RAN WG1 Meeting #60, R1-101287, San Francisco, CA, USA, Feb. 22-26, 2010, pp. 1-2.

3rd Generation Partnership Project. "Way Forward for MU-MIMO Design." 3GPP TSG RAN WG1 Meeting #49bis, R1-073100, Orlando, FL, USA, Jun. 25-29, 2007, pp. 1-4.

3rd Generation Partnership Project. "PMI-Based Multi-Granular Feedback for SU/MU-MIMO Operation." 3GPP TSG-RAN WG1 #60, R1-100852, San Francisco,CA, USA, Feb. 22-26, 2010, pp. 1-5.

3rd Generation Partnership Project. "Views on Codebook Design for Downlink 8Tx MIMO." 3GPP TSG RAN WG1 Meeting #60, R1-101219, San Francisco, USA, Feb. 22-26, 2010, pp. 1-10.

* cited by examiner

PRECODER STRUCTURE FOR MIMO PRECODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This *patent* application is *for a broadening reissue of U.S. Pat. No. 10,250,308, issued Apr. 2, 2019. U.S. Pat. No. 10,250,308 issued from U.S. patent application Ser. No. 15/822,488, filed Nov. 27, 2017 as* a continuation of U.S. patent application Ser. No. 15/138,675, filed Apr. 26, 2016, now U.S. Pat. No. 9,831,930, issued Nov. 28, 2017, which is a continuation of U.S. patent application Ser. No. 14/057,011, filed Oct. 18, 2013, now U.S. Pat. No. 9,331,830, issued May 3, 2016, which is a continuation of U.S. patent application Ser. No. 13/080,737, filed Apr. 6, 2011, now U.S. Pat. No. 8,582,627, issued Nov. 12, 2013, which claims the benefit of U.S. Provisional Patent Application No. 61/321,679, filed Apr. 7, 2010, all of which are hereby incorporated by reference as if fully set forth herein.

FIELD OF THE DISCLOSURE

The teachings herein generally relate to codebooks and precoding, and particularly relate to a factorized precoder structure that provides for reuse of precoders across different transmit antenna configurations, and provides for efficient precoder signaling.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and related techniques are commonly referred to simply as MIMO.

The 3GPP LTE standard is currently evolving with enhanced MIMO support. A core component of this support in LTE is the support of MIMO antenna deployments and MIMO related techniques. A current working assumption in LTE-Advanced is the support of an 8-layer spatial multiplexing mode for 8 transmit (Tx) antennas, with the possibility of channel dependent precoding. The spatial multiplexing mode provides high data rates under favorable channel conditions.

With spatial multiplexing, an information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder is typically selected from a codebook of possible precoders, and typically indicated by means of a precoder matrix indicator (PMI). The PMI value specifies a unique precoder in the codebook for a given number of symbol streams.

However, certain challenges arise in this context. For example, different antenna configurations can require precoder structures of one type or another, which complicates the storage of predefined codebooks of precoders. Still further, the dynamic use of Single User (SU) MIMO and Multi-User (MU) MIMO modes complicates codebook design because precoders that are optimal for SU-MIMO generally will not be optimal for MU-MIMO. As a further complication, the overhead associated with reporting precoder information, e.g., precoder recommendations, from a receiver to a transmitter may be problematic. This is true, for example, in the LTE downlink where the Physical Uplink Control Channel (PUCCH) cannot bear as large a payload size as the Physical Uplink Shared Channel (PUSCH).

SUMMARY

The teachings herein present a method and apparatus that implement and use a factorized precoder structure that is advantageous in terms of performance and efficiency. In particular, the teachings presented herein disclose an underlying precoder structure that allows for certain codebook reuse across different transmission scenarios, including for transmission from a single Uniform Linear Array (ULA) of transmit antennas and transmission from cross-polarized subgroups of such antennas. According to the contemplated precoder structure, an overall precoder is constructed from a conversion precoder and a tuning precoder. The conversion precoder includes antenna-subgroup precoders of size $N_T/2$, where $N_T$ represents the number of overall antenna ports considered. Correspondingly, the tuning precoder controls the offset of beam phases between the antenna-subgroup precoders, allowing the conversion precoder to be used with cross-polarized arrays of $N_T/2$ antenna elements, and with co-polarized arrays of $N_T$ antenna elements.

One embodiment disclosed herein relates to a wireless communication transceiver and an associated method, where another transceiver precodes transmissions to the transceiver based at least in part on receiving channel state information from the transceiver. Here, the channel state information includes precoder information for the other transmitter. As an example case, the transceiver is a user equipment (UE) and the other transceiver is a base station in a wireless communication network supporting the UE, and the UE sends precoder information to the base station that indicates precoder recommendations by the UE. As a particular example, the base station is an eNodeB configured for MIMO operation in an LTE network, and the UE is an LTE handset or other item of communication equipment configured for MIMO operation in the LTE context.

The transceiver is configured to select entries from one or more codebooks, where indications of the selected entries serves as the aforementioned precoder information sent to the other transceiver. The transceiver selects the entries as a selected conversion precoder and a selected tuning precoder, or as a selected overall precoder corresponding to a selected conversion precoder and a selected tuning precoder. It will be understood that the selections may be made and reported dynamically, on a periodic or as needed basis, to reflect changing channel conditions. The transceiver is further configured to transmit the indications of the selected entries in the channel state information.

Several aspects of the above operations center on the stored codebook(s) and, in particular, the underlying structure of the conversion and tuning precoders (or corresponding overall precoders) stored in them. The one or more codebooks stored at the transceiver include entries comprising a plurality of different conversion precoders and entries comprising a number of corresponding tuning precoders, or include entries comprising a plurality of overall precoders, with each overall precoder comprising the product of a conversion precoder and a tuning precoder.

In one embodiment, the codebook comprises $N_TQ$ conversion precoders. Each conversion precoder comprises a block diagonal matrix in which a block comprises an antenna-subgroup precoder. In turn, each antenna-subgroup precoder is a matrix block with $N_T/2$ rows and belongs to a set of $N_TQ$ different DFT-based beams, where Q is an integer equal to or greater than 2, and where each said tuning precoder includes a phase shift element taken from a 2Q Phase Shift Keying (PSK) alphabet and provides at least 2Q relative phase shifts for offsetting beam phases between the antenna-subgroup precoders in a corresponding one of the conversion precoders. Thus, each overall precoder comprises a DFT-based precoder providing for $N_T$ transmit beams across the $N_T$ transmit antenna ports.

This advantageous precoder structure allows, for example, precoding from cross-polarized subgroups of antennas, where the set of beams from each subgroup is controlled by a corresponding one of the DFT-based antenna-subgroup precoders in the conversion precoder selected by the transceiver performing the precoded transmission. Further, that same precoder structure allows for beamforming across an equal-sized overall array of antennas, where the beam-phase offsets between subgroups is provided by the correspondingly selected tuning precoder.

In other embodiments, each conversion precoder comprises a block diagonal matrix and has $2\lceil k/2 \rceil$ columns, where k is a non-negative integer. Each tuning precoder has the following properties: all non-zero elements are constant modulus; every column has exactly two non-zero elements; and every row has exactly two non-zero elements; two columns either have non-zero elements in the same two rows or do not have any non-zero elements in the same rows; and two columns having non-zero elements in the same two rows are orthogonal to each other. If row m in a tuning precoder column has a non-zero element, so does row $m+\lceil k/2 \rceil$. This precoder structure allows for full PA utilization.

Still further, this arrangement in one or more embodiments is exploited by reporting conversion precoder selections at a time or frequency resolution lower than that used for reporting tuning precoder selections. As one example, the transceiver sends indications of the selected tuning precoder more frequently than it sends indications of the selected conversion precoder. The other transceiver is configured to determine the selected overall precoder in between receiving conversion precoder selections, based on keeping the same conversion precoder but updating the overall precoder calculation with each newly received tuning precoder selection. The transceiver also may send one conversion precoder selection to be used in common with two or more tuning precoder selections, each one representing a different sub-band of a frequency band associated with the common conversion precoder.

In another embodiment, a method and associated transceiver are directed to precoding multi-antenna transmissions to another wireless communication transceiver. This embodiment can be understood relating to the transmitter side of the disclosed teachings, while the preceding examples related to the receiver side. Thus, in this example, the transceiver, which may be a base station precoding to a targeted UE, receives channel state information from the other transceiver, where that information includes precoder information, such as indications of precoder selections representing precoder recommendations.

The transceiver is configured to use the received precoder information to identify the precoder recommendations from the other transceiver. In the case where the received precoder information includes selection indicators such as PMIs or other codebook index values, the transceiver uses the selection indicators to select entries from one or more codebooks. The transceiver is further configured to precode a transmission to the other transceiver, based at least in part on the precoder recommendations. In this regard, it will be understood that the transceiver may simply follow the precoder recommendations sent by the other transceiver. However, the transceiver does not necessarily use the precoder selections indicated by the other transceiver and instead may make different selections, based on overall circumstances, such as the scheduling of multiple such transmissions, the MIMO mode in use, etc.

Of particular, interest, the transceiver uses the same one or more codebooks used by the other transmitter when making precoder recommendations. For example, both transceivers store copies of the same codebooks, or one of them stores one or more codebooks that are equivalent to those stored at the other transceiver.

As such, the transceiver's codebook(s), which may be held in a memory of the transceiver, store entries comprising a plurality of different conversion precoders and entries comprising a number of corresponding tuning precoders, or entries comprising a plurality of overall precoders, where each overall precoder comprises the product of a conversion precoder and a tuning precoder. In one embodiment, the codebook(s) comprise $N_TQ$ different conversion precoders. Each conversion precoder out of the $N_TQ$ different entries for the conversion precoders comprises a block diagonal matrix, in which each block comprises a DFT-based antenna-subgroup precoder that corresponds to a subgroup of $N_T$ transmit antenna ports. Each such antenna-subgroup precoder provides $N_TQ$ different DFT based beams for the corresponding subgroup, where Q is an integer value and where the $N_TQ$ different conversion precoders, together with one or more of the tuning precoders, correspond to a set of $N_TQ$ different overall precoders. Each overall precoder in that set represents a size-$N_T$ DFT-based beam over the $N_T$ transmit antennas ports.

In other embodiments, each conversion precoder comprises a block diagonal matrix and has $2\lceil k/2 \rceil$ columns, where k is a non-negative integer. Each tuning precoder has the following properties: all non-zero elements are constant modulus; every column has exactly two non-zero elements; and every row has exactly two non-zero elements; two columns either have non-zero elements in the same two rows or do not have any non-zero elements in the same rows; and two columns having non-zero elements in the same two rows are orthogonal to each other. If row m in a tuning precoder column has a non-zero element, so does row $m+\lceil k/2 \rceil$.

The transceiver in one or more embodiments is a base station configured for operation in a wireless communication network, e.g., an eNodeB configured for operation in an LTE network. In this case, the base station operates as a multi-antenna MIMO transmitter that considers precoder recommendations from the other transceiver, which may be a UE or other wireless communication device that is supported by the base station.

Of course, the above brief summary of features and advantages is not limiting. Other features and advantages will be apparent from the following detailed description of example embodiments and from the accompanying drawings.

BRIEF DESCRIPTION OF THE DRAWINGS

FIG. 5 depicts one codebook containing conversion precoders and another one containing tuning precoders, and where FIG. 6 depicts one codebook containing overall precoders, each corresponding to a particular conversion precoder and a particular tuning precoder.

DETAILED DESCRIPTION

Figure 1:
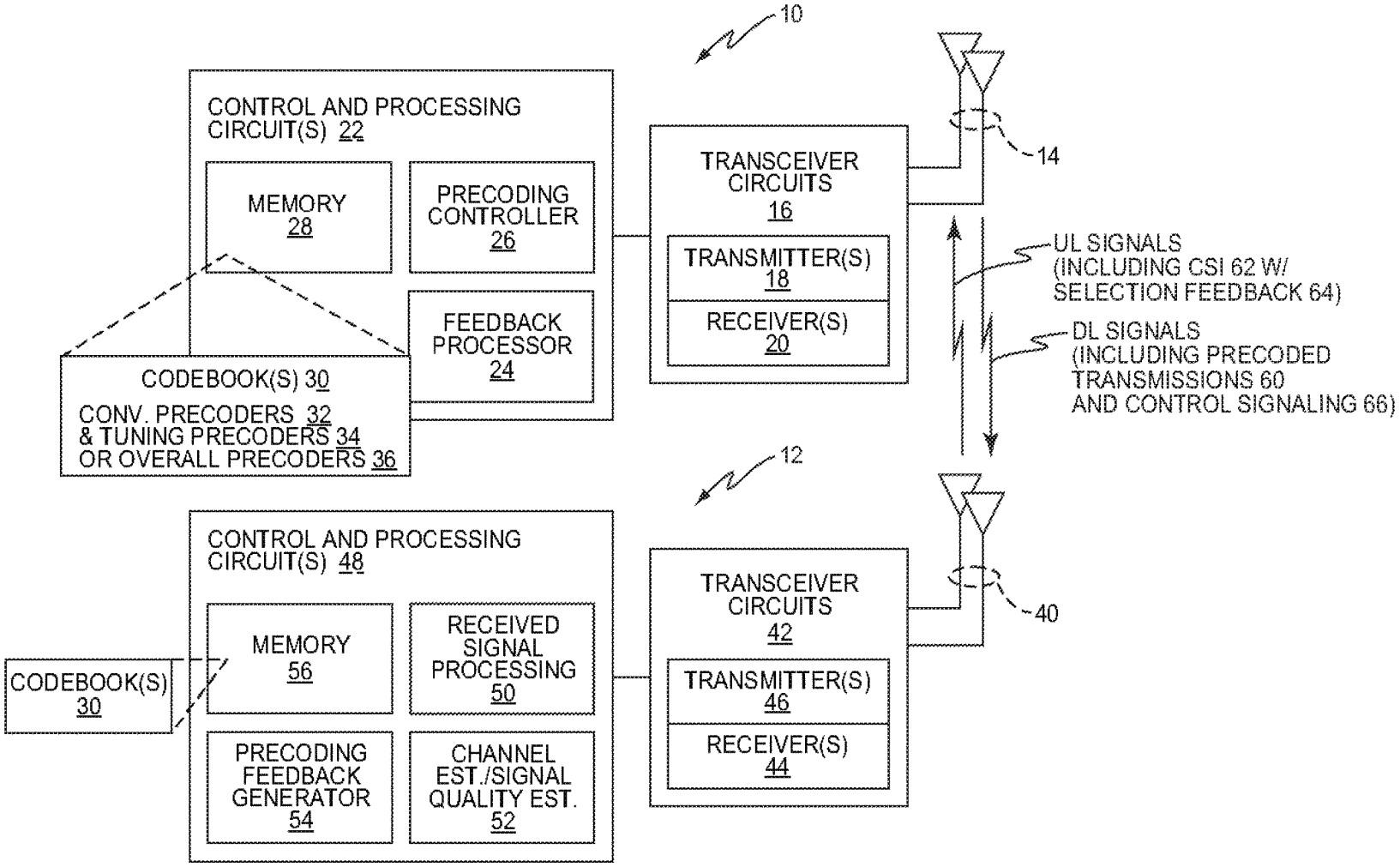
FIG. 1 is a block diagram of example embodiments of a first transceiver that is configured to transmit precoded transmissions to a second transceiver that is configured to provide precoder recommendations to the first transceiver.

FIG. 1 depicts a first wireless communication transceiver 10 and a second wireless communication transceiver 12, referred to for convenience as transceivers 10 and 12. The transceiver 10 includes a number of antennas 14 and associated transceiver circuits 16, including one or more radio-frequency transmitters 18 and receivers 20. Still further, the transceiver 10 includes control and processing circuits 22, which include a feedback processor 24, a precoding controller 26, and one or more memory/storage devices 28 that store one or more codebooks 30. The memory/storage devices 28 are simply referred to as "memory 28" for convenience.

The one or more codebooks 30 stored at the transceiver 10 include entries comprising $N_TQ$ different conversion precoders 32 and entries comprising a number of corresponding tuning precoders 34, or include entries comprising a plurality of overall precoders 36, with each overall precoder 36 comprising the product of a conversion precoder 32 and a tuning precoder 34. Here, it will be understood that the reference number "32" is used to refer to conversion precoders in the plural and singular senses, but each conversion precoder 32 generally is unique from the others, in terms of the numeric values representing its matrix elements. The same understanding applies to the reference numbers "34" and "36" as used for the tuning precoders and overall precoders, respectively.

Figure 2:
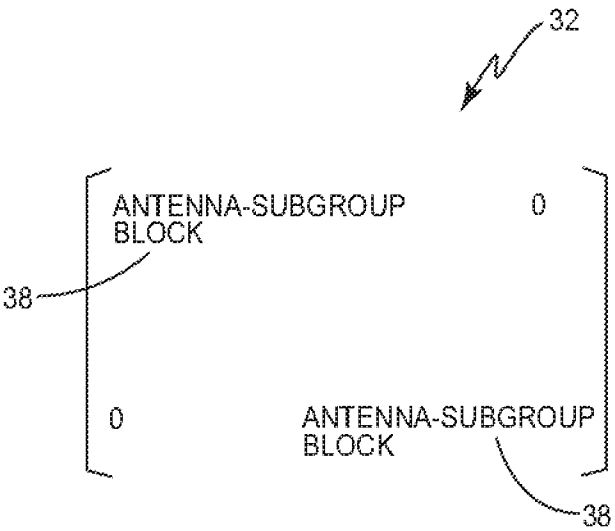
FIG. 2 is a diagram of one embodiment of a conversion precoder having a block-diagonal structure and including two antenna-subgroup precoders.

Each conversion precoder 32 comprises a block diagonal matrix in which each block comprises a DFT-based antenna-subgroup precoder 38 (shown in FIG. 2). Each antenna-subgroup precoder 38 is a matrix block with $N_T/2$ rows and belongs to a set of $N_TQ$ different DFT-based beams, where Q is an integer equal to or greater than 2, and where each tuning precoder 34 includes a phase shift element taken from a 2Q Phase Shift Keying (PSK) alphabet and provides at least 2Q relative phase shifts for offsetting beam phases between the antenna-subgroup precoders 38 in a corresponding one of the conversion precoders 32.

Continuing with FIG. 1, the second transceiver 12 includes a number of antennas 40 and associated transceiver circuits 42 (including one or more radio frequency receivers 44 and transmitters 46). The transceiver 12 further includes control and processing circuits 48. At least functionally, the control and processing circuits 48 include received signal processing circuitry 50, e.g., demodulation/decoding circuits, one or more estimation circuits 52 for estimating channel conditions and/or signal quality, a precoding feedback generator 54, and one or more memory/storage devices 56 (e.g., non-volatile memory such as EEPROM or FLASH, simply referred to as "memory 56" for convenience).

Memory 28 at the transceiver 10 and memory 56 at the transceiver 12 each store a copy of the same one or more codebook(s) 30, or equivalently, they store codebook(s) or equivalent information that allow the transceiver 10 and the transceiver 12 to have the same understanding in terms of the precoders selected by the transceiver 12 as "precoder recommendations." That is, in operation the transceiver 10 precodes transmissions 60 to the transceiver 12 based on determining a precoder operation to apply—i.e., based on determining the particular MIMO configuration and corresponding precoder weights to be used for multi-antenna transmission from the transceiver 10 to the transceiver 12.

The transceiver 10 determines the precoder operation based at least in part on receiving channel state information (CSI) 62 from the transceiver 12, which includes precoder information 64. The precoder information 64 may be understood as providing recommendations for precoder selection, and the precoder information 64 thus may be provided as Precoder Matrix Indicator (PMI) values for indexing into the one or more codebooks 30, or as some other type of selection indicators. In one or more embodiments, the transceiver 10 sends control signaling 66 to the transceiver 12, to control its precoder information 64. For example, the control signaling 66 may restrict precoder selections to a particular subset of precoders—e.g., those intended for SU-MIMO mode, or those intended for MU-MIMO mode.

In at least one embodiment, the control and processing circuits 22 of the transceiver 10 at least in part comprise computer-based circuitry, e.g., one or more microprocessors and/or digital signals processors, or other digital processing circuitry. In at least one embodiment, such circuitry is specially configured to implement the methods taught herein for the transceiver 10, based on executing stored computer program instructions. These instructions are, in one or more embodiments, stored in the memory 28. Likewise, in at least one embodiment, the control and processing circuits 48 of the transceiver 12 are implemented at least in part via programmable digital processing circuitry. For example, the control and processing circuits 48 in one or more embodiments include one or more microprocessors or digital signal processors configured to implement at least a portion of the method taught herein for the transceiver 12, based on executing computer program instructions stored in the memory 56.

Figure 3:
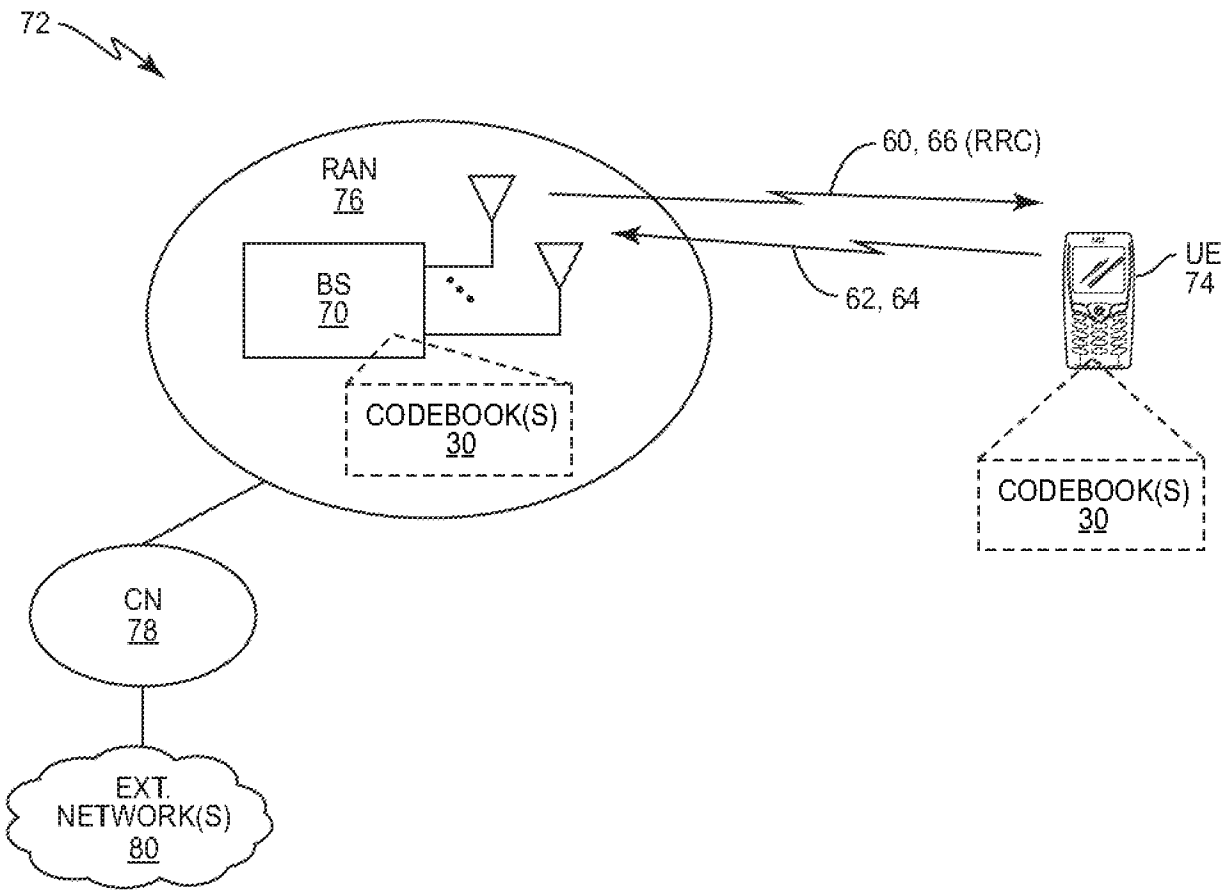
FIG. 3 is a block diagram of an example wireless communication network, where the first transceiver of FIG. 1 is represented as a network base station and the second transceiver of FIG. 1 is represented as an item of user equipment.

Such implementations may be understood in the example case of FIG. 3 where the transceiver 10 is configured as a wireless communication network base station 70 operating in a wireless communication network 72. The transceiver 12 is configured as a UE 74 and is supported by the network 72. The simplified network diagram further depicts a Radio Access Network (RAN) 76, including one or more the base stations 70, and an associated Core Network (CN) 78. This arrangement communicatively couples the UE 74 to other devices in the same network and/or in one or more other networks. To this end, the CN 78 is communicatively coupled to one or more external networks 80, such as the Internet and/or the PSTN.

The base station 70 stores the one or more codebooks 30, as does the UE 74. Accordingly, one sees precoded transmissions 60 sent from the base station 70 to the UE 74, along with optional control signaling 66 that controls the precoder recommendations made by the UE 74. Such signaling may be sent using Radio Resource Control (RRC) signaling, for example.

One also sees the transmission of precoder information 64 (i.e., precoder selection feedback) from the UE 74 to the base station 70. As noted, these recommendations comprise selection indicators, such as PMIs, that indicate the particular conversion and tuning precoders 32 and 34 that are currently recommended by the UE 74 for use by the base station 70 in precoding transmissions to the UE 74. In another embodiment, the recommendations comprise indications of the selected overall precoder 36, which corresponds to the selection of a particular conversion precoder 32 and a particular tuning precoder 34. However, even in this embodiment, an indication of the recommended overall precoder 36 can be understood as being equivalent to the indication of recommend conversion and tuning precoders 32 and 34.

Figure 4:
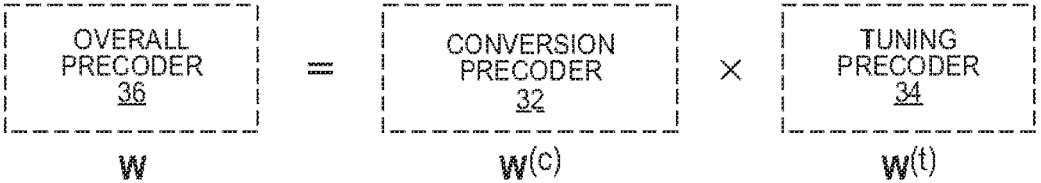
FIG. 4 is a diagram of example conversion and tuning precoders, as used to form an overall precoder.
Figure 5:
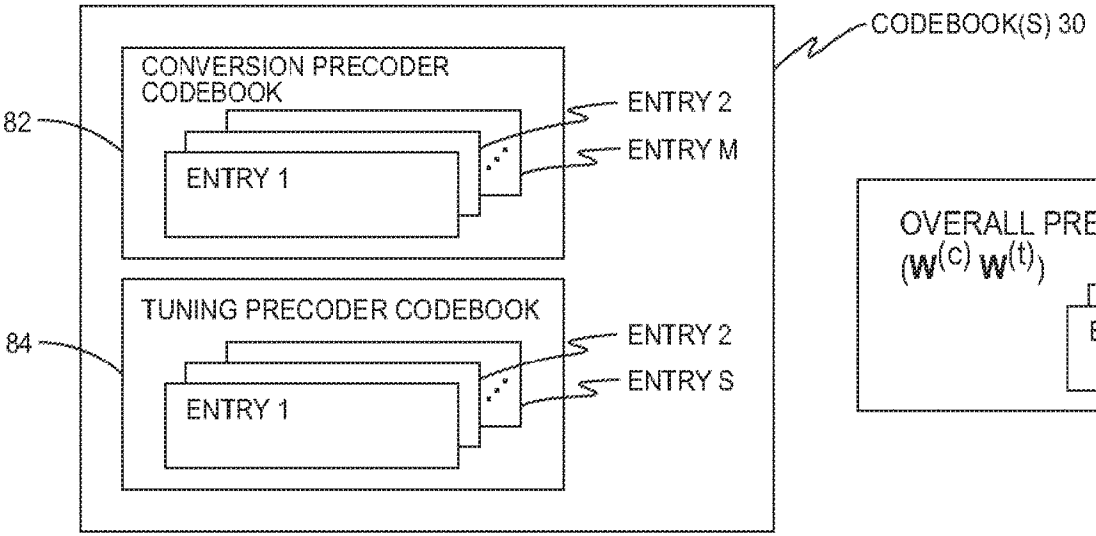
FIGS. 5 and 6 are diagrams of example codebooks, where
Figure 6:
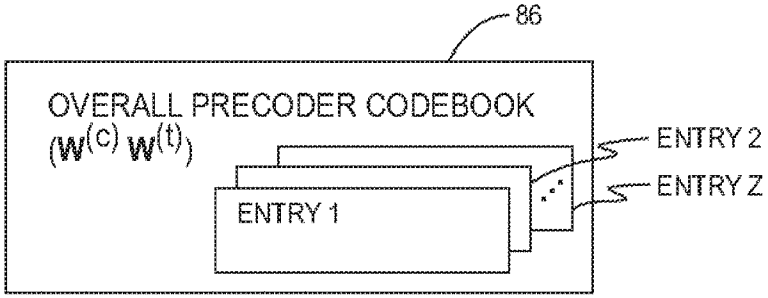

FIG. 4 provides a better illustration of this "factorized precoder" flexibility, where an overall precoder 36 (denoted as "W") is formed as the matrix multiplication of a selected conversion precoder 32 (denoted as "$W^{(c)}$") and a selected tuning precoder 34 (denoted as "$W^{(t)}$"). The codebook(s) 30 can comprise one codebook that includes a number of conversion precoders 32 at first index positions and a number of tuning precoders 34 at second index positions, thus allowing different ranges of index values for denoting conversion precoder selections and tuning precoder selections. Alternatively, the codebook(s) 30 can be implemented as two codebooks, such as shown in FIG. 5. Here, one codebook 82 contains conversion precoders 32, and one codebook 84 contains tuning precoders 34. As a further alternative, FIG. 6 illustrates that the one or more codebooks 30 may comprise one codebook 86 that contains a set of overall precoders 36, with each overall precoder 36 formed as the product (matrix multiplication) of a particular conversion precoder 32 and a particular tuning precoder 34.

In the case where separate conversion and tuning precoder codebooks 82 and 84 are used, the precoder information 64 may comprise a first index value that indexes (points) to particular conversion precoder 32 in the codebook 82, and a second index value that indexes (points) to a particular tuning precoder 34 in the codebook 84. In the case where one codebook 86 of overall precoders 36 is used, the index values may be two-dimensional row-column index values that point to a particular overall precoder 36 in a table structure.

Advantageously, in any of these cases, the precoder information 64 may include separate indications for conversion and tuning precoder selections. This provides for advantageous gains in signaling efficiency. For example, the transceiver 12 sends conversion precoder recommendations on a first interval, and tuning precoder recommendations on a second, shorter interval. In this case, from the perspective of the transceiver 10, the overall precoder 36 as recommended by the transceiver 12 is the product of the most recently recommended conversion precoder 32 and the most recently recommended tuning precoder 34. In another example embodiment, the transceiver 12 recommends one conversion precoder 32 for an overall frequency band, and recommends two or more tuning precoders 34 for each of two or more sub-bands. The transceiver 10 in this case recognizes the precoder information 64 as two or more overall precoders 36, each formed from the common conversion precoder 32 and a respective one of the two or more recommended tuning precoders 34.

In the case where a single codebook 86 of overall precoders 36 is used, that codebook may be arranged such that each row (or column) corresponds to a particular conversion precoder 32, while each column (or row) corresponds to a particular tuning precoder 34. A complete index thus comprises a row pointer and a column pointer, and the transceiver 12 can send these together or separately. For example, row pointer updates can be sent on one time interval or for an overall frequency band, for the conversion precoder selection, while column pointer updates can be sent on another faster time interval, or for particular sub-bands of the overall frequency band, for the tuning precoder selection(s). In this regard, it should be understood that one conversion precoder 32 can be used as a common base for two or more overall precoders 36, based on multiplying it with each of two or more tuning precoders 34.

Figure 7:
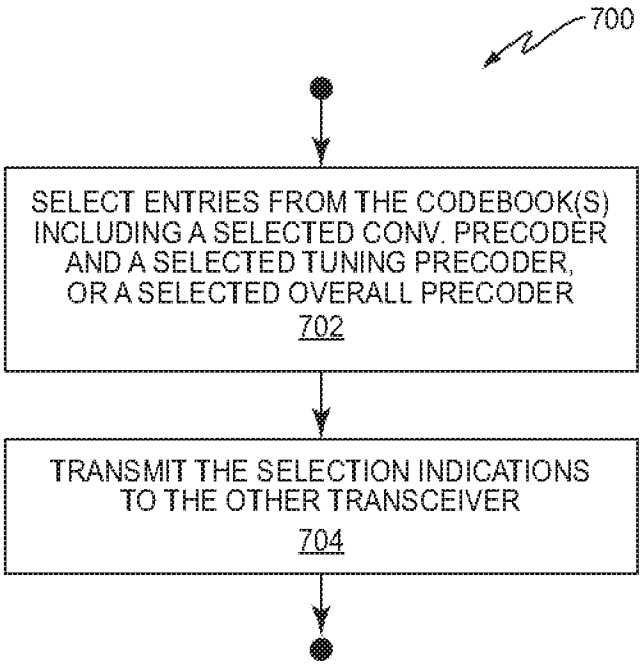
FIG. 7 is a logic flow diagram of one embodiment of a method of providing precoder recommendations from a second transceiver to a first transceiver, such as is shown in FIG. 1.

With these examples in mind, FIG. 7 illustrates a method 700 implemented in the transceiver 12. The transceiver 12 is configured to carry out the method 700 based on executing computer program instructions stored in its memory 56 and/or or based on having specifically configured circuitry. In any case, the method 700 includes the transceiver 12 selecting entries from one or more codebooks 30 as a selected conversion precoder 32 and a selected tuning precoder 34, or as a selected overall precoder 36 corresponding to a selected conversion precoder 32 and a selected tuning precoder 34 (Block 702). It will be understood that the precoding feedback generator 54 is adapted to perform these selections, based on computing the recommendations according to the factorized conversion and tuning precoder format.

Further, it will be understood that the transceiver 12 stores the codebook(s) 30 in its memory 56—e.g., it stores one codebook 82 of conversion precoders 32 and another codebook 84 of tuning precoders 34, or it stores a codebook 86 of overall precoders 36, e.g., with each representing the combination of a particular conversion precoder 32 and a particular tuning precoder 34. With that in mind, the method 700 continues with transmitting precoder information 64 to the transceiver 10 (Block 704).

As noted, separate indications for the selected conversion precoder 32 and the selected tuning precoder 34 may be used, to allow more frequent or higher resolution signaling of the tuning precoder recommendations and slower or lower (frequency) resolution signaling of the conversion precoder recommendations. In at least one embodiment, tuning precoder recommendations are sent on a lower layer of the signaling protocol used for communicatively coupling the transceiver 12 to the transceiver 10 that is used for signaling the conversion precoder recommendations. For example, referring to the wireless network case of FIG. 3, the conversion precoder recommendations are sent using Radio Resource Control (RRC) signaling, while the tuning precoder recommendations are sent on a lower layer.

Figure 8:
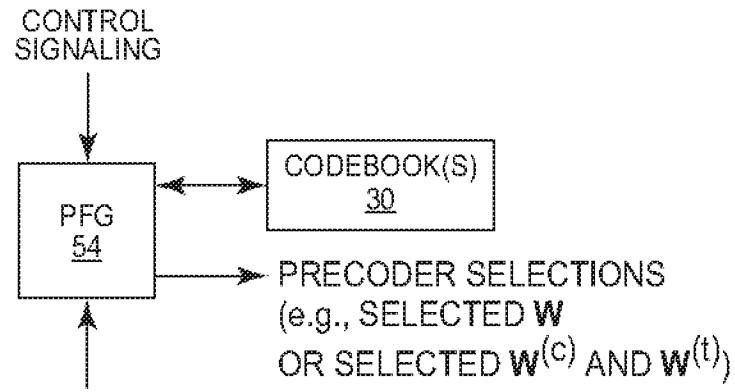
FIG. 8 is a partial block diagram of one embodiment of processing circuitry in the second transceiver, for determining precoder recommendations.

Regardless, the transceiver 12 makes its precoding recommendation selections based on, for example, evaluating channel conditions via the estimation circuits 52, which estimate channel conditions and/or evaluate received signal quality, such as SNR. And, as noted, it may control its recommendations responsive to control signaling 66 received from the transceiver 10. Such an arrangement is seen in the example of FIG. 8, wherein the precoding feedback generator 54 (abbreviated as "PFG" in the illustration) performs dynamic selection of conversion precoders 32 and tuning precoders 34 from the codebook(s) 30, based on evaluating the channel properties as determined by the estimation circuits 52.

It will be understood that the channel property information comprises, for example, complex coefficients representing multi-path propagation channel characteristics and/or channel properties such as impairment correlations, etc. The precoder selections may be made subject to any restrictions imposed by the control signaling 66, which may restrict the recommendation selections to predefined subsets of the precoders, such as one subset for the case where the transceiver 10 is operating in an MU-MIMO mode, and another subset for case where the transceiver 10 is operating in a SU-MIMO mode. This example is particularly pertinent to the example network case of FIG. 3, where the transceiver 10 is a base station 70 and may support pluralities of UEs 74 ("users").

Figure 9:
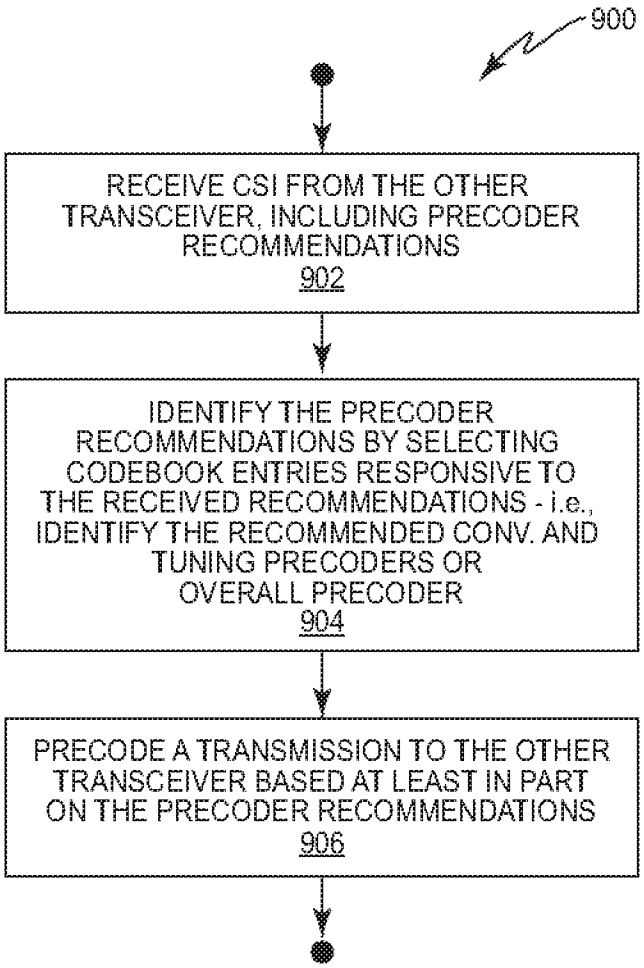
FIG. 9 is a logic flow diagram of one embodiment of a method of precoding transmissions from a first transceiver to a second transceiver, such as are shown in FIG. 1.

While FIG. 7 illustrates what might be considered as an example of the "receive" side method, FIG. 9 illustrates an example case for the "transmit" side method—i.e., it details example operations implemented by the transceiver 10. The method 900 is directed to precoding multi-antenna transmissions 60 to the transceiver 12, and includes receiving channel state information 62 from the other transceiver 12, including receiving selection indicators as the precoder information 64 (Block 902). The method 900 continues with identifying the precoder information 64 by selecting entries from one or more codebooks 30 stored at the transceiver 10, based on the selection indications included in the channel state information 62 (Block 904). Here, it will be understood that the feedback processor 24 at the transceiver 10 is adapted to handle the factorized feedback contemplated for the precoder information 64. That is, the feedback processor 24 is configured to extract and provide the conversion and tuning precoder recommendations included in the channel state information 62.

The method 900 further includes the transceiver 10 precoding a transmission 60 to the transceiver 12, based at least in part on the precoder information 64 (Block 906). As noted, the "selection" performed in Block 904 can be understood as the transceiver 10 identifying the overall precoder 36 that the transceiver 12 recommends for precoding the transmission 60 to the transceiver 12. However, when the transceiver 10 determines the actual precoding operation to apply in generating the transmission 60, it may follow the recommendations or make its own selections or modifications.

Figure 10:
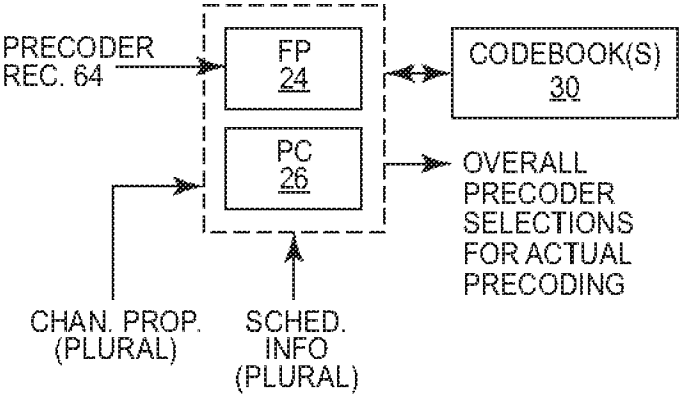
FIG. 10 is a partial block diagram of one embodiment of processing circuitry within the first transceiver for controlling the precoding of transmissions to the second transceiver.

FIG. 10 illustrates an example configuration where the feedback processor 24 and precoding controller 26 (abbreviated "FP" and "PC") determine the actual precoder selections to be used for precoding the transmissions 60 to the transceiver 12. These decisions depend on, for example, the precoder information 64 and channel properties as indicated in the channel state information 62, and on scheduling information. In particular, in the case where the transceiver 10 transmits to multiple transceivers 12, it may consider plural sets of data (e.g., channel conditions and scheduling data for multiple transceivers 12) in determining its precoding operations.

Figure 11:
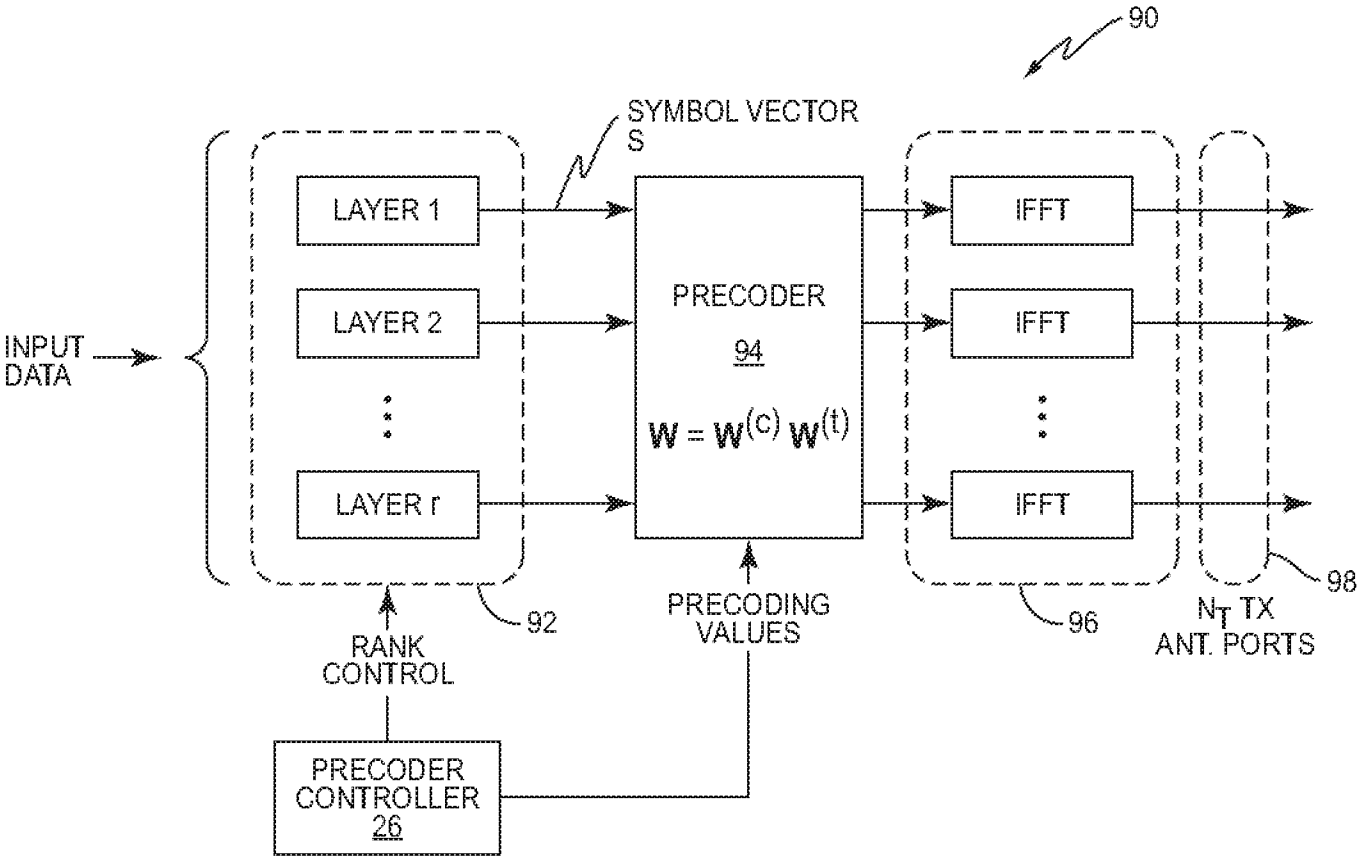
FIG. 11 is a block diagram of one embodiment of further precoding circuits for the first transceiver.

As for generating the precoded transmission 60, FIG. 11 depicts a precoding circuit 90 included in the transmitter 18 of the transceiver 10 and it will be understood as being associated with the precoding controller 26. The precoding circuit 90 enables the transceiver 10 to precode transmissions according to an applied precoding operation, and the transceiver 10 may have more than one such circuit.

According to the example illustration, the precoding circuit 90 receives input data, e.g., information symbols to be transmitted, and it includes layer processing circuits 92 that are responsive to a rank control signal from the precoding controller 26. Depending on the transmit rank in use, the input data is placed onto one or more spatial multiplexing layers and the corresponding symbol vector(s) s are input to a precoder 94.

As an example, the precoder 94 is shown as applying a selected overall precoder 36 (denoted as "W") that is formed as the matrix multiplication of a selected conversion precoder 32 (denoted as "$W^{(c)}$") and a selected tuning precoder 34 (denoted as "$W^{(t)}$"). More broadly, the precoder 94 applies a precoding operation determined by the precoding value(s) provided to it by the precoding controller 26. Those values may or may not follow the precoder information 64 included in the channel state information 62 received from the transceiver 12, but the transceiver 10 at least considers those recommendations in its precoding determinations. In any case, the precoder 94 outputs precoded signals to Inverse Fast Fourier Transform (IFFT) processing circuits 96, which in turn provide signals to a number of antenna ports 98 associated with the antennas 14 shown in FIG. 1.

Note that these ports are managed as a ULA in one embodiment, and are managed as antenna subgroups in another embodiment. Advantageously, the same conversion precoders 32 can be used for either case because each conversion precoder 32 comprises a block diagonal matrix.

In more detail, each conversion precoder 32 is one out of $N_TQ$ different entries in a codebook. Each conversion precoder 32 comprises a block diagonal matrix. Each such block diagonal matrix is a DFT-based antenna-subgroup precoder 38 that corresponds to a subgroup of $N_T$ transmit antenna ports 98 and provides $N_TQ$ different DFT based beams for the corresponding subgroup, where Q is an integer value and where the $N_TQ$ different conversion precoders 32, together with one or more of the tuning precoders 34, correspond to a set of $N_TQ$ different overall precoders 36, each overall precoder 36 thus representing a size-$N_T$ DFT-based beam over the $N_T$ transmit antennas ports 98.

To better understand the above arrangement, consider that antenna-subgroup precoder 38 is a matrix block with $N_T/2$ rows and belongs to a set of $N_TQ$ different DFT-based beams, where Q is an integer equal to or greater than 2. Further, each tuning precoder 34 includes a phase shift element taken from a 2Q Phase Shift Keying (PSK) alphabet and provides at least 2Q relative phase shifts for offsetting beam phases between the antenna-subgroup precoders 38 in a corresponding one of the conversion precoders 32. With this structure, each overall precoder 36 comprises a DFT-based precoder providing for $N_T$ transmit beams across $N_T$ transmit antenna ports.

As such, in at least one embodiment, the transceiver 10 is configured to perform DFT-based precoding of transmissions 60 from two or more subgroups of the antennas 14 at the transceiver 10. These operations are based on the transceiver 10 using the antenna-subgroup precoders 38 in one of the conversion precoders 32, as selected by the transceiver 10 from the one or more codebooks 30 based at least in part on the precoder information 64.

To better understand the advantages of the above precoder structure and in development of the underlying mathematical operations, consider a general precoder matrix. If the precoder matrix is confined to have orthonormal columns, then the design of the codebook of precoder matrices corresponds to a Grassmannian subspace packing problem. In any case, the r symbols in the symbol vector s each correspond to a layer and r is referred to as the transmission rank. In this way, spatial multiplexing is achieved because multiple symbols can be transmitted simultaneously over the same time/frequency resource element (TFRE). The number of symbols r is typically adapted to suit the current propagation channel properties.

LTE uses OFDM in the downlink (and DFT precoded OFDM in the uplink) and hence the received $N_R \times 1$ vector y, for a certain TFRE on subcarrier n (or alternatively data TFRE number n) is thus modeled by:

$$y_n = H_n W_{N_T \times r} s_n + e_n \tag{1}$$

where $e_n$ is a noise/interference vector obtained as realizations of a random process and $H_n$ is the complex channel. The precoder, $W_{N_T \times r}$, can be a wideband precoder, which is constant over frequency, or frequency selective.

Conventionally, the precoder matrix is often chosen to match the characteristics of the $N_R \times N_T$ MIMO channel matrix H, resulting in so-called channel dependent precoding. This is also commonly referred to as closed-loop precoding and essentially tries to focus the transmit energy into a subspace which is strong in the sense of conveying much of the transmitted energy to the targeted receiver. In addition, the precoder matrix also may be selected with the goal of orthogonalizing the channel, meaning that after proper linear equalization at a UE or other targeted receiver, the inter-layer interference is reduced.

According to the factorized precoder structure disclosed herein, the conversion precoders 32 are configured to have dimension $N_T \times k$, where k is configurable and preferably is less than the number of transmit antenna ports $N_T$ considered for precoding. In this regard $k < N_T$ advantageously restricts the number of channel dimensions that must be accounted for in the tuning precoders 34. Correspondingly, the tuning precoders 34 are configured to have dimension k×r, where r is the transmission rank. This arrangement is shown below:

$$W_{N_T \times r} = W_{N_T \times k}^{(c)} W_{k \times r}^{(t)}, \tag{2}$$

where the conversion precoder 32, $W_{N_T \times k}^{(c)}$, strives for capturing wideband/long-term properties of the channel such as correlation, while the tuning precoder 34, $W_{k \times r}^{(t)}$, targets frequency-selective/short-term properties of the channel.

The conversion precoder 32 exploits the correlation properties for focusing the tuning precoder 34 in "directions" where the propagation channel H on average is "strong." Typically, this is accomplished by reducing the number of dimensions k covered by the tuning precoder 34. In other words, the conversion precoder 32 becomes a tall matrix with a reduced number of columns. Consequently, the number of rows k of the tuning precoder 34 is reduced as well. With such a reduced number of dimensions, the codebook used for storing the tuning precoders 34 can be made smaller, while still maintaining good performance.

In one arrangement already shown, the conversion precoders 32 are in one codebook 82 and the tuning precoders 34 are in another codebook 84. This arrangement exploits the fact that the conversion precoders 32 should have high spatial resolution and thus are advantageously implemented as a codebook 82 with many elements, while the codebook 84 for the tuning precoders 34 should be made small to keep the signaling overhead at a reasonable level.

To see how correlation properties are exploited and dimension reduction achieved, consider the case where the $N_T$ different antennas 14 at the transceiver 10 are arranged into $N_T/2$ closely spaced cross-poles. Based on the polarization direction of the antenna subsets, the antennas in the closely spaced cross-pole setup can be divided into two groups, where each group is a closely spaced co-polarized Uniform Linear Array (ULA) with $N_T/2$ antennas. Closely spaced antennas often lead to high channel correlation and the correlation can in turn be exploited to maintain low signalling overhead. The channels corresponding to each such antenna group ULA are denoted $H_/$ and $H_\backslash$, respectively.

For convenience in notation, the following equations drop the subscripts indicating the dimensions of the matrices as well as the subscript n. Assume that each conversion precoder 32 has a block diagonal structure, $$W^{(c)} = \begin{bmatrix} \tilde{W}^{(c)} & 0 \\ 0 & \tilde{W}^{(c)} \end{bmatrix}. \tag{3}$$

The product of the MIMO channel H and the overall precoder 36 can then be written as:

$$\begin{aligned} HW &= [H_/ \;\; H_\backslash] W^{(c)} W^{(t)} \\ &= [H_/ \;\; H_\backslash] \begin{bmatrix} \tilde{W}^{(c)} & 0 \\ 0 & \tilde{W}^{(c)} \end{bmatrix} W^{(t)} \\ &= \left[ H_/ \tilde{W}^{(c)} \;\; H_\backslash \tilde{W}^{(c)} \right] W^{(t)} \\ &= H_{eff} W^{(t)} \end{aligned} \tag{4}$$

As seen, the matrix $\tilde{W}^{(c)}$ separately precodes each antenna group ULA, thereby forming a smaller and improved effective channel $H_{eff}$. As such, the blocks within $W^{(c)}$ are referred to as antenna subgroup precoders 38. If $\tilde{W}^{(c)}$ corresponds to a beamforming vector, the effective channel would reduce to having only two virtual antennas, which reduces the needed size of the codebook(s) 30 used for the second tuning precoder matrix $W^{(t)}$ when tracking the instantaneous channel properties. In this case, instantaneous channel properties are to a large extent dependent upon the relative phase relation between the two orthogonal polarizations.

It is also helpful for a fuller understanding of this disclosure to consider the theory regarding a "grid of beams," along with Discrete Fourier Transform (DFT) based precoding. DFT based precoder vectors for $N_T$ transmit antennas can be written in the form:

$$\begin{aligned} w_n^{(N_T,Q)} &= \left[ w_{1,n}^{(N_T,Q)} \;\; w_{2,n}^{(N_T,Q)} \;\; \ldots \;\; w_{N_T,n}^{(N_T,Q)} \right]^T \\ w_{m,n}^{(N_T,Q)} &= \exp\left( j \frac{2\pi}{N_T Q} mn \right), \; m = 0, \ldots, N_T - 1, \\ n &= 0, \ldots, QN_T - 1, \end{aligned} \tag{5}$$

where $w_{m,n}^{(N_T,Q)}$ is the phase of the m:th antenna, n is the precoder vector index (i.e., which beam out of the $QN_T$ beams) and Q is the oversampling factor. As seen, the phase increases with the same amount from one antenna port to another, i.e., linearly growing phase with respect to the antenna port index m. This is in fact a characteristic of DFT-based precoding. Thus DFT based precoder vectors may include additional phase shifts on top of those shown in the above expression as long as the overall phase shift is increasing linearly with m.

For good performance, it is important that the array gain function of two consecutive transmit beams overlaps in the angular domain, so that the gain does not drop too much when going from one beam to another. This requires an oversampling factor of at least Q=2. Thus for $N_T$ antennas, at least $2N_T$ beams are needed.

An alternative parameterization of the above DFT based precoder vectors is:

$$w_{l,q}^{(N_T,Q)} = \left[ w_{1,Ql+q}^{(N_T,Q)} \; w_{2,Ql+q}^{(N_T,Q)} \; \ldots \; w_{N_T,Ql+q}^{(N_T,Q)} \right]^T \tag{6}$$

$$w_{m,Ql+q}^{(N_T,Q)} = \exp\left(j\frac{2\pi}{N_T}m\left(l+\frac{q}{Q}\right)\right),$$

for m=0, . . . , $N_T$−1, l=0, . . . , $N_T$−1, q=0,1, . . . , Q−1, and where l and q together determine the precoder vector index via the relation n=Ql+q. This parameterization also highlights that there are Q groups of beams, where the beams within each group are orthogonal to each other. The q:th group can be represented by the generator matrix:

$$G_q^{(N_T)} = \left[ w_{0,q}^{(N_T,Q)} \; w_{l,q}^{(N_T,Q)} \; \ldots \; w_{N_T-1,q}^{(N_T,Q)} \right]. \tag{7}$$

By insuring that only precoder vectors from the same generator matrix are being used together as columns in the same precoder, it is straightforward to form sets of precoder vectors for use in so-called unitary precoding where the columns within a precoder matrix should form an orthonormal set.

Further, to maximize the performance of DFT based precoding, it is useful to center the grid of beams symmetrically around the broad size of the array. Such a rotation of the beams can be done by multiplying from the left the above DFT vectors $w_n^{(N_T,Q)}$ with a diagonal matrix $W_{rot}$ having elements:

$$[W_{rot}]_{mm} = \exp\left(j\frac{\pi}{QN_T}m\right). \tag{8}$$

The rotation can either be included in the precoder codebook or alternatively can be carried out as a separate step where all signals are rotated in the same manner and the rotation can thus be absorbed into the channel from the perspective of the receiver (transparent to the receiver). For the remainder of DFT-precoding discussion herein, it is tacitly assumed that rotation may or may not have been carried out as part of DFT-based precoding.

One aspect of the above-described factorized precoder structure relates to lowering the overhead associated with signaling the conversion and tuning precoders 32 and 34, based on signaling them with different frequency and/or time granularity. The use of a block diagonal conversion precoder 32 is specifically optimized for the case of a transmit antenna array comprising closely spaced cross-poles, but other antenna arrangements exist as well. In particular, efficient performance with a ULA of closely spaced co-poles should also be achieved using the same conversion precoders 32. The precoder structures disclosed herein advantageously provide for use of the same conversion precoder structure, irrespective of whether the transceiver 10 uses its antennas as a ULA of $N_T$ closely-spaced co-poles, or as two subsets cross-poles, each subset having $N_T/2$ antenna elements.

In particular, in one or more embodiments, the conversion precoders 32 comprise DFT-based precoders which are suitable for the two $N_T/2$ element antenna group ULAs in a closely spaced cross-pole setup, while still providing for their re-use in forming the needed number of DFT based size $N_T$ precoders for an $N_T$ element ULA. Moreover, one or more embodiments disclosed herein provide a structure for the conversion precoder that allows re-using existing codebooks with DFT based precoders and extending their spatial resolution.

In any case, an example embodiment illustrates re-using DFT based precoder elements for an antenna group ULA in a closely spaced cross-pole and also in creating a grid of beams with sufficient overlap for a ULA of twice the number of elements compared with the antenna group ULA. In other words, the conversion precoders 32 can be designed for use with the multiple antennas 14 of the transceiver 10, regardless of whether those antennas 14 are configured and operated as an overall ULA of $N_T$ antennas, or as two cross-polarized ULA sub-groups, each having $N_T/2$ antennas.

Consider again the block diagonal factorized precoder design given as:

$$W = W^{(c)}W^{(t)} = \begin{bmatrix} \bar{W}^{(c)} & 0 \\ 0 & \bar{W}^{(c)} \end{bmatrix} W^{(t)}, \tag{9}$$

and note that in order to tailor the transmission to ±45 degrees cross-poles, the structure of a conversion precoder 32 can be modified by means of a multiplication from the left with a matrix:

$$\begin{bmatrix} I & Ie^{j\phi} \\ I & -Ie^{j\phi} \end{bmatrix}, \tag{10}$$

which, for $\phi$=0, rotates the polarizations 45 degrees to align with horizontal and vertical polarization. Other values of $\phi$ may be used to achieve various forms of circular polarization.

For an $N_T$ element ULA, the overall precoder 36 for rank 1 is to be an $N_T \times 1$ vector as:

$$W = w_n^{(N_T,Q)} = \left[ w_{1,n}^{(N_T,Q)} \; w_{2,n}^{(N_T,Q)} \; \ldots \; w_{N_T,n}^{(N_T,Q)} \right]^T. \tag{11}$$

For antennas m=0, 1, . . . , $N_T/2-1$, $$w_{m,n}^{(N_T,Q)} = \exp\left(j\frac{2\pi}{N_TQ}mn\right) = \exp\left(j\frac{2\pi}{\frac{N_T}{2}(2Q)}mn\right) = w_{m,n}^{(N_T/2,2Q)}, \tag{12}$$

$$n = 0, \ldots, QN_T - 1,$$

while for the remaining antennas m=$N_T/2$+m', m'=0, 1, . . . , $N_T/2-1$, $$\begin{aligned} w_{N_T/2+m'n}^{(N_T,Q)} &= \exp\left(j\frac{2\pi}{N_TQ}(N_T/2+m')n\right) \\ &= \exp\left(j\frac{2\pi}{\frac{N_T}{2}(2Q)}m'n\right)\exp\left(j\frac{\pi}{Q}n\right) \\ &= w_{m',n}^{(N_T/2,2Q)}\exp\left(j\frac{\pi}{Q}n\right) \\ &= w_{m',n}^{(N_T/2,2Q)}\alpha, \end{aligned} \tag{13}$$

$$n = 0, \ldots, QN_T - 1.$$

Here, $$\alpha \in \left\{\exp\left(j\frac{\pi}{Q}n\right): n = 0, 1, \ldots, 2Q-1\right\}.$$

Any $N_T$ element DFT overall precoder 36 can thus be written as:

$$\begin{aligned} w_n^{(N_T,Q)} &= \\ &\left[w_{0,n}^{(N_T,Q)}\ w_{1,n}^{(N_T,Q)}\ \ldots\ w_{N_T-1,n}^{(N_T,Q)}\ w_{0,n}^{(N_T,Q)}\alpha\ w_{1,n}^{(N_T,Q)}\alpha\ \ldots\ w_{N_T-1,n}^{(N_T,Q)}\alpha\right]^T = \\ &\begin{bmatrix} w_n^{(N_T/2,2Q)} \\ w_n^{(N_T/2,2Q)}\alpha \end{bmatrix} = \begin{bmatrix} w_n^{(N_T/2,2Q)} & 0 \\ 0 & w_n^{(N_T/2,2Q)} \end{bmatrix}\begin{bmatrix} 1 \\ \alpha \end{bmatrix}. \end{aligned} \tag{14}$$

One sees in the above arrangement that $w_n^{(N_T,Q)}$ may be regarded as an example of an overall precoder 36 formed from a conversion precoder 32 given as:

$$\begin{bmatrix} w_n^{(N_T/2,2Q)} & 0 \\ 0 & w_n^{(N_T/2,2Q)} \end{bmatrix},$$

and a tuning precoder 34 given as $$\begin{bmatrix} 1 \\ \alpha \end{bmatrix}.$$

Note further that each block, $w_n^{(N_T/2,2Q)}$, of the conversion precoder 32 represents one of the antenna-subgroup precoders 38 included in the conversion precoder 32, and note that the tuning precoders 34 are determined as:

$$\left\{\begin{bmatrix} 1 \\ \exp\left(j\frac{\pi}{Q}n\right) \end{bmatrix}: n = 0, 1, \ldots, 2Q-1\right\}. \tag{15}$$

The above arrangement suits the closely spaced cross-polarized antenna array perfectly because size $N_T/2$ DFT-based antenna-subgroup precoders 38 are now applied on each antenna group ULA and the tuning precoder 34 provides 2Q different relative phase shifts between the two orthogonal polarizations. It is also seen how the $N_T/2$ element antenna-subgroup precoders 38 are reused for constructing the $N_T$ element overall precoder 36. Of further note, the oversampling factor Q is twice as large in the cross-polarized case as it is for the co-polarized case, but those elements are not wasted because they help to increase the spatial resolution of the grid of beams precoders even further. This characteristic is particularly useful in MU-MIMO applications where good performance relies on the ability to very precisely form beams towards the UE of interest and nulls towards the other co-scheduled UEs.

For example, take a special case of $N_T$=8 transmit antennas—i.e., assume that the transceiver 10 of FIG. 1 includes eight antennas 14, for use in precoded MIMO transmissions, and assume that Q=2 for the closely spaced ULA. One sees that the overall precoder 36 is built up as:

$$\begin{aligned} w_n^{(8,2)} &= \begin{bmatrix} w_n^{(N_T/2,2Q)} \\ w_n^{(N_T/2,2Q)}\alpha \end{bmatrix} \\ &= \begin{bmatrix} w_n^{(4,4)} & 0 \\ 0 & w_n^{(4,4)} \end{bmatrix}\begin{bmatrix} 1 \\ \exp\left(j\frac{\pi}{2}n'\right) \end{bmatrix}, \end{aligned} \tag{16}$$

$$n = 0, \ldots, 2N_T - 1,\ n' = 0, 1, 2, 3.$$

The codebook entries for the tuning precoders 34 can then be chosen from the rank 1,2 Tx codebook in LTE and hence that codebook can be re-used in the teachings disclosed herein. The codebook for the conversion precoders 32 contains elements constructed from four DFT based generator matrices as in Eq. (7). The codebook(s) 30 can contain other elements in addition to the DFT based ones being described here. Broadly, the principle of constructing N element DFT-based overall precoders 36 out of smaller, N/2 element DFT-based antenna-subgroup precoders 38 can be used in general to add efficient closely spaced ULA and cross-pole support to a range of codebook-based precoding schemes. As a further advantage, the disclosed precoder structure can be used even if the antenna setups differ from what is being discussed here.

Further, note that DFT-based overall precoders 36 can be used for higher transmission ranks than one. One way to accomplish this is to pick the conversion precoders 32 as column subsets of DFT-based generator matrices, such as shown in Eq. (7). The tuning precoders 34 can be extended with additional columns as well, to match the desired value of the transmission rank. For transmission rank 2, a tuning precoder 34 can be structured as:

$$W^{(t)} = \begin{bmatrix} 1 & 1 \\ \alpha & -\alpha \end{bmatrix},\ \alpha \in \left\{\exp\left(j\frac{\pi}{Q}n\right): n = 0, 1, \ldots, 2Q-1\right\}. \tag{17}$$

It is sometimes beneficial to re-use existing codebooks in the design of new codebooks. However, one associated problem is that existing codebooks may not contain all the needed DFT precoder vectors to provide at least Q=2 times oversampling of the grid of beams. Assuming for example that one has an existing codebook for $N_T/2$ antennas with DFT precoders providing $Q=Q_e$ in oversampling factor and that the target oversampling factor for the $N_T/2$ element antenna group ULA is $Q=Q_t$. The spatial resolution of the existing codebook can then be improved to the target oversampling factor in factorized precoder design as:

$$w = \begin{bmatrix} \Lambda_{\bar{q}} w_n^{(N_T/2,Q_e)} & 0 \\ 0 & \Lambda_{\bar{q}} w_n^{(N_T/2,Q_e)} \end{bmatrix}\begin{bmatrix} 1 \\ \alpha \end{bmatrix}, \tag{18}$$

$$n = 0, \ldots, Q_eN_T - 1,\ \bar{q} = 0, 1, \ldots, Q_t/Q_e - 1$$

-continued $$\Lambda_{\tilde{q}} = \mathrm{diag}\left(1, \exp\left(j\frac{2\pi}{\frac{N_T}{2}}\frac{\tilde{q}}{Q_t}1\right), \exp\left(j\frac{2\pi}{\frac{N_T}{2}}\frac{\tilde{q}}{Q_t}2\right), \ldots, \exp\left(j\frac{2\pi}{\frac{N_T}{2}}\frac{\tilde{q}}{Q_t}(N_T/2-1)\right)\right).$$

Here, the $w_n^{(N_T/2,Q_e)}$ could be elements in the existing LTE 4 Tx House Holder codebook, which contains 8 DFT based precoders (using an oversampling factor of Q=2 so that there is some overlap among the beams spanning four antennas) for rank 1. When the transmission rank is higher than one, the block diagonal structure can be maintained and the structure thus generalizes to:

$$W = \begin{bmatrix} \Lambda_{\tilde{q}}\tilde{W}^{(c)} & 0 \\ 0 & \Lambda_{\tilde{q}}\tilde{W}^{(c)} \end{bmatrix} W^{(t)}, \tag{19}$$

where W is now an $N_T \times r$ matrix, $\tilde{W}^{(c)}$ is a matrix with at least one column equal to a DFT based antenna-subgroup precoder $w_n^{(N_T/2,Q_e)}$, and the tuning precoder $W^{(t)}$ has r columns.

To see that that the spatial resolution can be improved by multiplying an antenna-subgroup precoder 38 with a diagonal matrix as described above, consider the alternative parameterization of DFT precoders in Eq. (6), $$w_{m,Q_t l+q}^{(N_T,Q_t)} = \exp\left(j\frac{2\pi}{N_T}m\left(l+\frac{q}{Q_t}\right)\right), \; m = 0, \ldots, N_T-1, \; l = 0, \ldots, N_T-1, \; q = 0, \ldots, Q_t-1, \tag{20}$$

$$l=0, \ldots, N_T-1, \; q=0, \ldots, Q_t-1,$$

and let:

$$q = \frac{Q_t}{Q_e}q' + \tilde{q}, \; q' = 0, \ldots, Q_e-1, \; \tilde{q} = 0, \ldots, \frac{Q_t}{Q_e}-1, \tag{21}$$

to arrive at:

$$\begin{aligned} w_{m,Q_t l+\frac{Q_t}{Q_e}q'+\tilde{q}}^{(N_T,Q_t)} &= \exp\left(j\frac{2\pi}{N_T}m\left(l+\frac{1}{Q_t}\left(\frac{Q_t}{Q_e}q'+\tilde{q}\right)\right)\right) \\ &= \exp\left(j\frac{2\pi}{N_T}m\left(l+\frac{q'}{Q_e}\right)\right)\exp\left(j\frac{2\pi}{N_T}m\frac{\tilde{q}}{Q_t}\right) \\ &= w_{m,Q_e l+q'}^{(N_T,Q_e)}\exp\left(j\frac{2\pi}{N_T}m\frac{\tilde{q}}{Q_t}\right) \end{aligned} \tag{22}$$

$$\text{for } m = 0, \ldots, N_T-1, \; l = 0, \ldots, N_T-1, \; q' = 0, \ldots, Q_e-1, \; \tilde{q} = 0, \ldots, \frac{Q_t}{Q_e}-1.$$

The above formulations demonstrate an advantageous aspect of the teachings presented herein. Namely, a codebook containing DFT precoders with oversampling factor $Q_e$ can be used for creating a higher resolution DFT codebook by multiplying the m:th element with exp $$\left(j\frac{2\pi}{N_T}m\frac{\tilde{q}}{Q_t}\right)$$

and hence proving that the diagonal transformation given by $\Lambda_{\tilde{q}}$ indeed works as intended.

Another issue to take into account when designing precoders is to ensure an efficient use of the power amplifiers (PAs), e.g., the PAs in the transmitters 18 used for multi-antenna transmission from the transceiver 10. Usually, power cannot be borrowed across antennas because there is a separate PA for each antenna. Hence, for maximum use of the PA resources, it is important that the same amount of power is transmitted from each antenna. In other words, an overall precoder matrix W for precoding from the transmit antennas should fulfill $$[WW^*]_{mm}=\kappa, \; \forall m. \tag{23}$$

Thus, it is beneficial from a PA utilization point of view to enforce this constraint when designing precoder codebooks. Full power utilization is also ensured by the so-called constant modulus property, which means that all scalar elements in a precoder have the same norm (modulus). It is easily verified that a constant modulus precoder also fulfills the full PA utilization constraint in Eq. (23). Hence, the constant modulus property constitutes a sufficient but not necessary condition for full PA utilization.

With the beneficial aspect of full PA utilization in mind, another aspect of the teachings presented herein relates to providing precoders that yield full PA utilization. In particular, one or more embodiments proposed herein solve the problems associated with full PA utilization and satisfaction of the rank nested property, in the context of a factorized precoder design. By using a so-called double block diagonal tuning precoder 34 combined with a block diagonal conversion precoder 32, full PA utilization is guaranteed and rank override exploiting the nested property is also possible for the overall precoder formed as the combination of a conversion precoder 32 and a tuning precoder 34 having the properties and structure disclosed herein.

A first step in designing efficient factorized precoder codebooks while achieving full PA utilization and fulfilling rank nested property is to make the conversion precoders block diagonal as shown in Eq. (3), for example. In a particular case, the number of columns k of a conversion precoder is made equal to $2\lceil r/2 \rceil$, where $\lceil \cdot \rceil$ denotes the ceil function. This structure is achieved by adding two new columns contributing equally much to each polarization for every other rank. In other words, the conversion precoder 32 at issue here can be denoted as $W^{(c)}$ and written in the form:

$$W^{(c)} = \begin{bmatrix} \tilde{W}^{(c)} & 0 \\ 0 & \tilde{W}^{(c)} \end{bmatrix} = \begin{bmatrix} \tilde{w}_1^{(c)} & \tilde{w}_2^{(c)} & \ldots & \tilde{w}_{\lceil r/2 \rceil}^{(c)} & 0 & 0 & \ldots & 0 \\ 0 & 0 & \ldots & 0 & \tilde{w}_1^{(c)} & \tilde{w}_2^{(c)} & \ldots & \tilde{w}_{\lceil r/2 \rceil}^{(c)} \end{bmatrix}, \tag{24}$$

where $\tilde{w}_l^{(c)}$ is an $N_T/2 \times 1$ vector.

Extending the conversion dimension in this manner helps keep the number of dimensions small and in addition serves to make sure that both polarizations are excited equally much. It is beneficial if the conversion precoder, denoted here as $\tilde{W}^{(c)}$, is also made to obey a generalized rank nested property in that there is freedom to choose $\tilde{W}^{(c)}$ with L columns as an arbitrary column subset of each possible $\tilde{W}^{(c)}$ with L+1 columns. An alternative is to have the possibility to signal the column ordering used in $\tilde{W}^{(c)}$. Flexibility in the choice of columns for $\tilde{W}^{(c)}$ for the different ranks is beneficial so as to still be able to transmit into the strongest subspace of the channel even when rank override using a column subset is performed.

Further, as regards to ensuring full PA utilization, e.g., at the transceiver 10, the tuning precoders 34, which are denoted as $W^{(t)}$, are in one or more embodiments constructed as follows: (a) the conversion vector $\tilde{w}_n^{(c)}$ is made constant modulus; and (b) a column in the tuning precoder has exactly two non-zero elements with constant modulus. If the m:th element is non-zero, so is element $m+\lceil r/2 \rceil$. Hence for rank r=4, the columns in the tuning precoder 34 are of the following form:

$$\begin{bmatrix} x \\ 0 \\ x \\ 0 \end{bmatrix}, \begin{bmatrix} 0 \\ x \\ 0 \\ x \end{bmatrix}, \tag{25}$$

where x denotes an arbitrary non-zero value which is not necessarily the same from one x to another. Because there are two non-zero elements in a column, two orthogonal columns with the same positions of the non-zero elements can be added before columns with other non-zero positions are considered. Such pairwise orthogonal columns with constant modulus property can be parameterized as:

$$\begin{bmatrix} 1 \\ 0 \\ e^{j\phi} \\ 0 \end{bmatrix}, \begin{bmatrix} 1 \\ 0 \\ -e^{j\phi} \\ 0 \end{bmatrix}. \tag{26}$$

Rank nested property for the overall precoder is upheld when increasing the rank by one by ensuring that columns for previous ranks excite the same columns of the conversion precoder also for the higher rank. Combining this with Eq. (25) and the mentioned pairwise orthogonal property of the columns leads to a double block diagonal structure of the tuning precoder taking the form:

$$W = \begin{bmatrix} \tilde{w}_1^{(c)} & \tilde{w}_2^{(c)} & \dots & \tilde{w}_{\lceil r/2 \rceil}^{(c)} & 0 & 0 & \dots & 0 \\ 0 & 0 & \dots & 0 & \tilde{w}_1^{(c)} & \tilde{w}_2^{(c)} & \dots & \tilde{w}_{\lceil r/2 \rceil}^{(c)} \end{bmatrix} \begin{bmatrix} x & x & 0 & 0 & \dots \\ 0 & 0 & x & x & \\ \vdots & & & & \ddots \\ & & & & \\ x & x & 0 & 0 & \dots \\ 0 & 0 & x & x & \\ \vdots & & & & \ddots \end{bmatrix}. \tag{27}$$

Using the pairwise orthogonality property in Eq. (26), and representing the structure for the overall precoder 36, denoted as W, as $W=W^{(c)}W^{(t)}$, the precoder structure can be further specialized into:

$$W = \begin{bmatrix} \tilde{w}_1^{(c)} & \tilde{w}_2^{(c)} & \dots & \tilde{w}_{\lceil r/2 \rceil}^{(c)} & 0 & 0 & \dots & 0 \\ 0 & 0 & \dots & 0 & \tilde{w}_1^{(c)} & \tilde{w}_2^{(c)} & \dots & \tilde{w}_{\lceil r/2 \rceil}^{(c)} \end{bmatrix} \tag{28}$$

-continued $$\begin{bmatrix} 1 & 1 & 0 & 0 & \dots \\ 0 & 0 & 1 & 1 & \\ \vdots & & & & \ddots \\ & & & & \\ e^{j\phi_1} & -e^{j\phi_1} & 0 & 0 & \dots \\ 0 & 0 & e^{j\phi_2} & -e^{j\phi_2} & \\ \vdots & & & & \ddots \end{bmatrix}.$$

Note that the double block diagonal structure for the tuning precoder can be described in different ways depending on the ordering of the columns used for storing the conversion precoders $W^{(c)}$ as entries in the codebook 30. It is possible to equivalently make the tuning precoders $W^{(t)}$ block diagonal by writing:

$$W = \begin{bmatrix} \tilde{w}_1^{(c)} & 0 & \tilde{w}_2^{(c)} & 0 & \dots & \dots & \tilde{w}_{\lceil r/2 \rceil}^{(c)} & 0 \\ 0 & \tilde{w}_1^{(c)} & 0 & \tilde{w}_2^{(c)} & \dots & \dots & 0 & \tilde{w}_{\lceil r/2 \rceil}^{(c)} \end{bmatrix} \begin{bmatrix} x & x & 0 & 0 & \dots & 0 & 0 \\ x & x & 0 & 0 & & & \vdots \\ 0 & 0 & x & x & \ddots & & \\ \vdots & & x & x & & & \\ & & 0 & 0 & \ddots & & \\ & & \vdots & & & 0 & 0 \\ & & & & \ddots & x & x \\ 0 & 0 & 0 & 0 & \dots & 0 & x & x \end{bmatrix}. \tag{29}$$

Re-orderings similar to these do not affect the overall precoder W and are thus considered equivalent and assumed to be covered under the terms "block diagonal conversion precoder and double block diagonal tuning precoder." It is also interesting to note that if the requirements on the orthogonality constraint and full PA utilization are relaxed, the design for rank nested property can be summarized with the following structure for the tuning precoders 34:

$$\begin{bmatrix} x & x & x & x & x & x \\ 0 & 0 & x & x & x & x \\ \vdots & & & & x & x & \ddots \\ & & & & & \\ x & x & x & x & x & x \\ 0 & 0 & x & x & x & x \\ \vdots & & & & x & x & \ddots \end{bmatrix}. \tag{30}$$

Further, it is worth mentioning that rank nested property can be useful when applied separately to the conversion precoders 32 and the tuning precoders 34. Even applying it only to the tuning precoders 34 can help save computational complexity, because precoder calculations across ranks can be re-used as long as the selected conversion precoder $W^{(c)}$ remains fixed.

As an illustrative example for eight transmit antennas 14 at the transceiver 10, assume that Rank r = 1:

$$W = \begin{bmatrix} w_1^{(1)} & \\ & w_1^{(1)} \end{bmatrix} \begin{bmatrix} 1 \\ e^{j\varphi_k} \end{bmatrix} \tag{31}$$

Rank r = 2:

-continued $$W = \begin{bmatrix} w_1^{(1)} & \\ & w_1^{(1)} \end{bmatrix} \begin{bmatrix} 1 & 1 \\ e^{j\varphi_k} & -e^{j\varphi_k} \end{bmatrix} \tag{32}$$

Rank r = 3:

$$W = \begin{bmatrix} w_1^{(1)} & w_2^{(1)} & \\ & & w_1^{(1)} & w_2^{(1)} \end{bmatrix} \begin{bmatrix} 1 & 1 & 0 \\ 0 & 0 & 1 \\ e^{j\varphi_k} & e^{j\varphi_k} & 0 \\ 0 & 0 & e^{j\varphi_l} \end{bmatrix} \tag{33}$$

Rank r = 4:

$$W = \begin{bmatrix} w_1^{(1)} & w_2^{(1)} & \\ & & w_1^{(1)} & w_2^{(1)} \end{bmatrix} \begin{bmatrix} 1 & 1 & 0 & 0 \\ 0 & 0 & 1 & 1 \\ e^{j\varphi_k} & -e^{j\varphi_k} & 0 & 0 \\ 0 & 0 & e^{j\varphi_l} & -e^{j\varphi_l} \end{bmatrix} \tag{34}$$

Rank r = 5:

$$W = \begin{bmatrix} w_1^{(1)} & w_2^{(1)} & w_3^{(1)} & \\ & & & w_1^{(1)} & w_2^{(1)} & w_3^{(1)} \end{bmatrix} \begin{bmatrix} 1 & 1 & 0 & 0 & 0 \\ 0 & 0 & 1 & 1 & 0 \\ 0 & 0 & 0 & 0 & 1 \\ e^{j\varphi_k} & -e^{j\varphi_k} & 0 & 0 & 0 \\ 0 & 0 & e^{j\varphi_l} & -e^{j\varphi_l} & 0 \\ 0 & 0 & 0 & 0 & e^{j\varphi_m} \end{bmatrix} \tag{35}$$

Rank r = 6:

$$W = \begin{bmatrix} w_1^{(1)} & w_2^{(1)} & w_3^{(1)} & \\ & & & w_1^{(1)} & w_2^{(1)} & w_3^{(1)} \end{bmatrix} \begin{bmatrix} 1 & 1 & 0 & 0 & 0 & 0 \\ 0 & 0 & 1 & 1 & 0 & 0 \\ 0 & 0 & 0 & 0 & 1 & 1 \\ e^{j\varphi_k} & -e^{j\varphi_k} & 0 & 0 & 0 & 0 \\ 0 & 0 & e^{j\varphi_l} & -e^{j\varphi_l} & 0 & 0 \\ 0 & 0 & 0 & 0 & e^{j\varphi_m} & -e^{j\varphi_m} \end{bmatrix} \tag{36}$$

Rank r = 7:

$$W = \begin{bmatrix} w_1^{(1)} & w_2^{(1)} & w_3^{(1)} & w_4^{(1)} & \\ & & & & w_1^{(1)} & w_2^{(1)} & w_3^{(1)} w_4^{(1)} \end{bmatrix} \begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 0 & 0 & 0 & 0 & 0 & 0 & 1 \\ e^{j\varphi_k} & -e^{j\varphi_k} & 0 & 0 & 0 & 0 & 0 \\ 0 & 0 & e^{j\varphi_l} & -e^{j\varphi_l} & 0 & 0 & 0 \\ 0 & 0 & 0 & 0 & e^{j\varphi_m} & -e^{j\varphi_m} & 0 \\ 0 & 0 & 0 & 0 & 0 & 0 & e^{j\varphi_n} \end{bmatrix} \tag{37}$$

Rank r = 8:

$$W = \begin{bmatrix} w_1^{(1)} & w_2^{(1)} & w_3^{(1)} & w_4^{(1)} & \\ & & & & w_1^{(1)} & w_2^{(1)} & w_3^{(1)} w_4^{(1)} \end{bmatrix} \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ e^{j\varphi_k} & -e^{j\varphi_k} & 0 & 0 & 0 & 0 & 0 & 0 \\ 0 & 0 & e^{j\varphi_l} & -e^{j\varphi_l} & 0 & 0 & 0 & 0 \\ 0 & 0 & 0 & 0 & e^{j\varphi_m} & -e^{j\varphi_m} & 0 & 0 \\ 0 & 0 & 0 & 0 & 0 & 0 & e^{j\varphi_n} & -e^{j\varphi_n} \end{bmatrix} \tag{38}$$

The four Tx case follows in a similar manner.

With the above in mind, the following structure and provisions are proposed herein, for one or more embodiments that provide for full PA utilization:

1. The overall precoder 36 can be factorized into a conversion precoder 32 and a tuning precoder 34.
   a. the conversion precoder 32 is block diagonal
   b. the tuning precoder 34 has the properties:
      i. all non-zero elements are constant modulus
      ii. every column has exactly two non-zero elements
      iii. every row has exactly two non-zero elements
2. Two columns in the tuning precoder 34 either have non-zero elements in the same two rows or do not have any non-zero elements in the same rows.
3. Two columns in the tuning precoder 34 having non-zero elements in the same two rows are orthogonal to each other.
4. The conversion precoder 32 has $2\lceil k/2 \rceil$ columns and if row m in a tuning precoder column has a non-zero element, so does row $m+\lceil k/2 \rceil$.
5. The columns of the tuning precoder 34 for rank r is a subset of the columns of the tuning precoder for rank r+1

With the above in mind, one method herein comprises a method of precoding multi-antenna transmissions 60 from a wireless communication transceiver 10 to another wireless communication transceiver 12. The method includes selecting an overall precoder 36, determining transmission weights for respective ones of two or more transmit antennas 14 according to the selected overall precoder 36, and transmitting weighted signals from the two or more transmit antennas 14 in accordance with the transmission weights. The selected precoder is selected at least in part based on considering precoder information received from the second transceiver 12, which includes indications of precoder selections made by the second transceiver 12, which are intended as precoding recommendations to be considered by the first transceiver 10.

According to the above method, the overall precoder 36 factorizes into a conversion precoder 32 and a tuning precoder 34, wherein the conversion precoder 32 is block diagonal and wherein the tuning precoder 34 has the following properties: all non-zero elements are constant modulus; every column has exactly two non-zero elements; and every row has exactly two non-zero elements; two columns either have non-zero elements in the same two rows or do not have any non-zero elements in the same rows; and two columns having non-zero elements in the same two rows are orthogonal to each other. Further, the conversion precoder 32 has $2\lceil k/2 \rceil$ columns, where k is a non-negative integer, and if row m in a tuning precoder column has a non-zero element, so does row $m+\lceil k/2 \rceil$.

Further, in at least one such embodiment, the columns of a tuning precoder 34 for rank r is a subset of the columns of a tuning precoder for rank r+1.

Similarly, another method disclosed herein provides for sending precoding information from a second transceiver 12 to a first transceiver 10 that considers the precoding information in selecting precoders for precoding multi-antenna transmissions 60 to the second transceiver 12.

The method includes the second transceiver 12 selecting an overall precoder 36 that factorizes into a conversion precoder 32 and a tuning precoder 34, or selecting the conversion precoder 32 and the tuning precoder 34 corresponding to a particular overall precoder 36, and sending to the first transceiver 10 as said precoder information an indication of the selected overall precoder 36 or indications of the selected conversion and tuning precoders 32, 34.

For this method, the conversion precoders 32 are each block diagonal and each tuning precoder 34 has the following properties: all non-zero elements are constant modulus;

every column has exactly two non-zero elements; and every row has exactly two non-zero elements; two columns either have non-zero elements in the same two rows or do not have any non-zero elements in the same rows; and two columns having non-zero elements in the same two rows are orthogonal to each other. Additionally, according to the method, the conversion precoder 32 has $2\lceil k/2 \rceil$ columns, where k is a non-negative integer, and if row m in a tuning precoder column has a non-zero element, so does row $m+\lceil k/2 \rceil$. Still further, in at least one embodiment, the columns of a tuning precoder 34 for rank r is a subset of the columns of a tuning precoder for rank r+1.

Of course, the teachings herein are not limited to the specific, foregoing illustrations. For example, terminology from 3GPP LTE was used in this disclosure to provide a relevant and advantageous context for understanding operations at the transceivers 10 and 12, which were identified in one or more embodiments as being an LTE eNodeB and an LTE UE, respectively. However, the teachings disclosed herein are not limited to these example illustrations and may be advantageously applied to other contexts, such as networks based on WCDMA, WiMax, UMB or GSM.

Further, the transceiver 10 and the transceiver 12 are not necessarily a base station and an item of mobile equipment within a standard cellular network, although the teachings herein have advantages in such a context. Moreover, while certain wireless network examples given herein involve the "downlink" from an eNodeB or other network base station, the teachings presented herein also have applicability to the uplink. More broadly, it will be understood that the teachings herein are limited by the claims and their legal equivalents, rather than by the illustrative examples given herein.

The invention claimed is:

1. A method in a wireless communication transceiver, wherein another transceiver precodes transmissions to the transceiver based at least in part on the transceiver sending channel state information to the other transceiver that includes precoder information and wherein the method is characterized by:

selecting entries from one or more codebooks as a selected conversion precoder and a selected tuning precoder, or as a selected overall precoder corresponding to a selected conversion precoder and a selected tuning precoder; and transmitting indications of the selected entries as said precoder information included in the channel state information;

wherein the one or more codebooks include entries comprising $N_TQ$ different conversion precoders, $N_T$ being a number of transmit antenna ports and Q being an integer value, and entries comprising a number of corresponding tuning precoders, or include entries comprising a plurality of overall precoders, with each overall precoder comprising a product of a conversion precoder and a tuning precoder; [and]

wherein each said conversion precoder out of said $N_TQ$ different entries comprises a block diagonal matrix in which each block comprises a discrete Fourier transform (DFT)-based antenna-subgroup precoder that corresponds to a subgroup of $N_T$ transmit antenna ports at the transceiver[and provides $N_TQ$ different DFT based beams for the corresponding subgroup], where the $N_TQ$ different conversion precoders, together with one or more of the tuning precoders, correspond to a set of $N_TQ$ different overall precoders[, wherein each overall precoder represents a size-$N_T$ DFT-based beam over the $N_T$ transmit antenna ports,];

wherein said one or more codebooks includes conversion and tuning precoders or corresponding overall precoders for multiple transmission ranks[,]; and wherein for transmission rank r>2:

the tuning precoder has 2[r/2] rows and r columns, where r is the transmission rank;

all non-zero elements of the tuning precoder are constant modulus;

every column of the tuning precoder has exactly two non-zero elements;

every row of the tuning precoder has exactly two non-zero elements; and two columns of the tuning precoder having non-zero elements in the same two rows are orthogonal to each other.

2. The method of claim 1, further characterized in that the other transceiver is a base station in a wireless communication network and the transceiver is a user equipment, UE, sending said channel state information to said base station.

3. The method of claim 2, further characterized in that transmitting said indications of the selected entries as the precoder information from the UE to the base station comprises transmitting index values indicating the selected entries within the one or more codebooks.

4. The method of claim 1, further characterized in that said each antenna-subgroup precoder is a matrix block with $N_T/2$ rows and belongs to a set of $N_TQ$ different DFT-based beams, where Q is an integer equal to or greater than 2, and where each said tuning precoder includes a phase shift element taken from a 2Q Phase Shift Keying (PSK) alphabet and provides at least 2Q relative phase shifts for offsetting beam phases between the antenna-subgroup precoders in a corresponding one of the conversion precoders.

5. The method of claim 1, wherein the columns of a tuning precoder for rank r is a subset of the columns of a tuning precoder for rank r+1.

6. The method of claim 1, further characterized in that each conversion precoder can be written in the form $$\begin{bmatrix} w_n^{(N_T/2,2Q)} & 0 \\ 0 & w_n^{(N_T/2,2Q)} \end{bmatrix},$$

where $$w_n^{(N_T,Q)} = \left[w_{1,n}^{(N_T,Q)}\ w_{2,n}^{(N_T,Q)}\ \ldots\ w_{N_T,n}^{(N_T,Q)}\right]^T,$$

and $$w_{m,n}^{(N_T,Q)} = \exp\left(j\frac{2\pi}{N_TQ}mn\right),\ m = 0, \ldots, N_T - 1,$$

$$n = 0, \ldots, QN_T - 1,$$

where $w_{m,n}^{(N_T,Q)}$ is a phase of the m:th antenna port, n is a precoder vector index indicating one of [the] *a plurality of* $N_TQ$ beams and Q represents an oversampling factor, and where each tuning precoder can be written in the form $$\begin{bmatrix} 1 \\ \alpha \end{bmatrix},$$

where $$\alpha \in \left\{ \begin{bmatrix} 1 \\ \exp\left(j\frac{\pi}{Q}n\right) \end{bmatrix} : n = 0, 1, \ldots, 2Q-1 \right\},$$

and where the corresponding overall precoder can be written in the form $$\begin{bmatrix} w_n^{(N_T/2,2Q)} & 0 \\ 0 & w_n^{(N_T/2,2Q)} \end{bmatrix} \begin{bmatrix} 1 \\ \alpha \end{bmatrix}.$$

7. A wireless communication transceiver configured to send channel state information to another wireless communication transceiver that precodes transmissions to the transceiver based at least in part on the channel state information, said transceiver including a receiver for receiving signals from the other transceiver and a transmitter for transmitting signals to the other transceiver, including transmitting signals conveying said channel state information, wherein said transceiver is characterized by:

a memory storing one or more codebooks including entries comprising $N_TQ$ different conversion precoders, $N_T$ being a number of transmit antenna ports, and Q being an integer value, and entries comprising a number of corresponding tuning precoders, or entries comprising a plurality of overall precoders, with each overall precoder comprising a product of a conversion precoder and a tuning precoder, wherein each said conversion precoder out of said $N_TQ$ different entries comprises a block diagonal matrix in which each block comprises a discrete Fourier transform (DFT)-based antenna-subgroup precoder that corresponds to a subgroup of $N_T$ transmit antenna ports at the transceiver [and provides $N_TQ$ different DFT based beams for the corresponding subgroup], where Q is an integer value and where the $N_TQ$ different conversion precoders, together with one or more of the tuning precoders, correspond to a set of $N_TQ$ different overall precoders[, wherein each overall precoder represents a size-$N_T$ DFT-based beam over the $N_T$ transmit antennas ports]; and a precoding feedback generator configured to select entries from the one or more codebooks as a selected conversion precoder and a selected tuning precoder, or as a selected overall precoder corresponding to a selected conversion precoder and a selected tuning precoder;

said precoding feedback generator further configured to transmit, via said transmitter, indications of the selected entries as precoder information included in said channel state information[,];

wherein said one or more codebooks includes conversion and tuning precoders or corresponding overall precoders for multiple transmission ranks[,]; and wherein for transmission rank r>2:

the tuning precoder has 2[r/2] rows and r columns, where r is the transmission rank;

all of the tuning precoder non-zero elements are constant modulus;

every column of the tuning precoder has exactly two non-zero elements;

every row of the tuning precoder has exactly two non-zero elements; and two columns of the tuning precoder having non-zero elements in the same two rows are orthogonal to each other.

8. The transceiver of claim 7, further characterized in that the other transceiver is a base station in a wireless communication network and the transceiver is a user equipment, UE, sending said channel state information to said base station.

9. The transceiver of claim 7, further characterized in that each conversion precoder can be written in the form $$\begin{bmatrix} w_n^{(N_T/2,2Q)} & 0 \\ 0 & w_n^{(N_T/2,2Q)} \end{bmatrix},$$

where $$w_n^{(N_T,Q)} = \left[ w_{1,n}^{(N_T,Q)} \; w_{2,n}^{(N_T,Q)} \; \ldots \; w_{N_T,n}^{(N_T,Q)} \right]^T,$$

and $$w_{m,n}^{(N_T,Q)} = \exp\left(j\frac{2\pi}{N_TQ}mn\right), \; m = 0, \ldots, N_T-1,$$

$$n = 0, \ldots, QN_T-1,$$

where $w_{m,n}^{(N_T,Q)}$ is a phase of the m:th antenna port, n is a precoder vector index indicating one of [the] *a plurality of* $N_TQ$ beams and Q represents an oversampling factor, and where each tuning precoder can be written in the form $$\begin{bmatrix} 1 \\ \alpha \end{bmatrix},$$

where $$\alpha \in \left\{ \begin{bmatrix} 1 \\ \exp\left(j\frac{\pi}{Q}n\right) \end{bmatrix} : n = 0, 1, \ldots, 2Q-1 \right\},$$

and where the corresponding overall precoder can be written in the form $$\begin{bmatrix} w_n^{(N_T/2,2Q)} & 0 \\ 0 & w_n^{(N_T/2,2Q)} \end{bmatrix} \begin{bmatrix} 1 \\ \alpha \end{bmatrix}.$$

10. A method of precoding multi-antenna transmissions from a wireless communication transceiver to another wireless communication transceiver, based at least in part on receiving channel state information from the other transceiver that includes precoder information, said method characterized by:

identifying the precoder information by selecting entries from one or more codebooks known at the transceiver responsive to selection indications included in the channel state information; and precoding a transmission to the other transceiver based at least in part on the precoder information;

wherein the one or more codebooks as known by the transceiver include entries comprising $N_TQ$ different conversion precoders, $N_T$ being a number of transmit antenna ports and Q being an integer value, and entries comprising a number of corresponding tuning precoders, or entries comprising a plurality of overall precoders, with each overall precoder comprising a product of a conversion precoder and a tuning precoder, and wherein each said conversion precoder out of said $N_TQ$ different entries comprises a block diagonal matrix in which each block comprises a discrete Fourier transform (DFT)-based antenna-subgroup precoder that corresponds to a subgroup of $N_T$ transmit antenna ports [and provides $N_TQ$ different DFT based beams for the corresponding subgroup], wherein the $N_TQ$ different conversion precoders, together with one or more of the tuning precoders, correspond to a set of $N_TQ$ different overall precoders[, wherein each overall precoder represents a size- $N_T$ DFT-based beam over the $N_T$ transmit antenna ports,]; *and* wherein said one or more codebooks includes conversion and tuning precoders or corresponding overall precoders for multiple transmission ranks, and wherein for transmission rank r>2:

the tuning precoder has 2[r/2] rows and r columns, where r is the transmission rank;

all non-zero elements of the tuning precoder are constant modulus;

every column of the tuning precoder has exactly two non-zero elements;

every row of the tuning precoder has exactly two non-zero elements; and two columns of the tuning precoder having non-zero elements in the same two rows are orthogonal to each other.

11. The method of claim 10, further characterized by performing DFT-based precoding of transmissions from two or more subgroups of the antennas at the transceiver using the antenna-subgroup precoders in one of the conversion precoders, as selected by the transceiver from the one or more codebooks based at least in part on the precoder information.

12. The method of claim 10, further characterized in that each conversion precoder can be written in the form $$\begin{bmatrix} w_n^{(N_T/2,2Q)} & 0 \\ 0 & w_n^{(N_T/2,2Q)} \end{bmatrix},$$

where $$w_n^{(N_T,Q)} = \left[w_{1,n}^{(N_T,Q)}\ w_{2,n}^{(N_T,Q)}\ \dots\ w_{N_T,n}^{(N_T,Q)}\right]^T,$$

and $$w_{m,n}^{(N_T,Q)} = \exp\left(j\frac{2\pi}{N_TQ}mn\right),\ m = 0, \dots, N_T - 1,\ n = 0, \dots, QN_T - 1,$$

where $w_{m,n}^{(N_T,Q)}$ is a phase of the m:th antenna port, n is a precoder vector index indicating one of [the] *a plurality of* $N_TQ$ beams and Q represents an oversampling factor, and where each tuning precoder can be written in the form $$\begin{bmatrix} 1 \\ \alpha \end{bmatrix},$$

where $$\alpha \in \left\{\begin{bmatrix} 1 \\ \exp\left(j\frac{\pi}{Q}n\right) \end{bmatrix} : n = 0, 1, \dots, 2Q - 1\right\},$$

and where the corresponding overall precoder can be written in the form $$\begin{bmatrix} w_n^{(N_T/2,2Q)} & 0 \\ 0 & w_n^{(N_T/2,2Q)} \end{bmatrix}\begin{bmatrix} 1 \\ \alpha \end{bmatrix}.$$

13. A wireless communication transceiver configured to precode multi-antenna transmissions to another wireless communication transceiver based at least in part on receiving channel state information from the other transceiver, said transceiver including a transmitter and a plurality of antennas for transmitting said multi-antenna transmissions and a receiver for receiving the channel state information, and wherein the transceiver is characterized by:

a memory storing one or more codebooks including entries comprising $N_TQ$ different conversion precoders, $N_T$ being a number of transmit antenna ports and Q being an integer value, and entries comprising a number of corresponding tuning precoders, or entries comprising a plurality of overall precoders, with each overall precoder comprising a product of a conversion precoder and a tuning precoder, wherein each said conversion precoder out of said $N_TQ$ different entries comprises a block diagonal matrix in which each block comprises a discrete Fourier transform (DFT)-based antenna-subgroup precoder that corresponds to a subgroup of $N_T$ transmit antenna ports [and provides $N_TQ$ different DFT based beams for the corresponding subgroup], where the $N_TQ$ different conversion precoders together with one or more of the tuning precoders correspond to a set of $N_TQ$ different overall precoders[, wherein each overall precoder represents a size- $N_T$ DFT-based beam over the $N_T$ transmit antenna ports];

a feedback processor configured to identify precoder information from the other receiver based on using selection indications included in the channel state information to identify from the one or more codebooks selected conversion and tuning precoders or a selected overall precoder corresponding to selected conversion and tuning precoders; and a precoding controller and associated precoding circuit configured to precode the transmission to the other transceiver, based at least in part on the precoder information[.];

wherein said one or more codebooks includes conversion and tuning precoders or corresponding overall precoders for multiple transmission ranks[.]; and wherein for transmission rank r>2:

the tuning precoder has 2[r/2] rows and r columns, where r is the transmission rank;

all non-zero elements of the tuning precoder are constant modulus;

every column of the tuning precoder has exactly two non-zero elements;

every row of the tuning precoder has exactly two non-zero elements[.]; and two columns of the tuning precoder having non-zero elements in the same two rows are orthogonal to each other.

14. The transceiver of claim 13, further characterized in that the precoding controller and associated precoding circuit are configured to precode the transmission to the other transceiver by performing DFT-based precoding of transmissions from two or more subgroups of the antennas using antenna-subgroup precoders in the conversion or overall precoder selected by the transceiver from the one or more codebooks, where said selection by the transceiver is based at least in part on the precoder information.

15. The transceiver of claim 13, further characterized in that each conversion precoder can be written in the form $$\begin{bmatrix} w_n^{(N_T/2,2Q)} & 0 \\ 0 & w_n^{(N_T/2,2Q)} \end{bmatrix},$$

where $$w_n^{(N_T,Q)} = \left[w_{1,n}^{(N_T,Q)}\ w_{2,n}^{(N_T,Q)}\ \ldots\ w_{N_T,n}^{(N_T,Q)}\right]^T,$$

and $$w_{m,n}^{(N_T,Q)} = \exp\left(j\frac{2\pi}{N_T Q}mn\right),\ m = 0, \ldots, N_T - 1,\ n = 0, \ldots, QN_T - 1,$$

where $w_{m,n}^{(N_T,Q)}$ is a phase of the m:th antenna port, n is a precoder vector index indicating one of [the] *a plurality of* $N_T Q$ beams and Q represents an oversampling factor, and where each tuning precoder can be written in the form $$\begin{bmatrix} 1 \\ \alpha \end{bmatrix},$$

where $$\alpha \in \left\{\begin{bmatrix} 1 \\ \exp\left(j\frac{\pi}{Q}n\right) \end{bmatrix} : n = 0, 1, \ldots, 2Q - 1\right\},$$

and where the corresponding overall precoder can be written in the form $$\begin{bmatrix} w_n^{(N_T/2,2Q)} & 0 \\ 0 & w_n^{(N_T/2,2Q)} \end{bmatrix}\begin{bmatrix} 1 \\ \alpha \end{bmatrix}.$$

* * * * *